US010411914B2

(12) United States Patent
Gudovskiy et al.

(10) Patent No.: US 10,411,914 B2
(45) Date of Patent: Sep. 10, 2019

(54) DATA DETECTION IN MIMO SYSTEMS WITH DEMODULATION AND TRACKING REFERENCE SIGNALS

(71) Applicant: Intel IP Corporation, Santa Clara, CA (US)

(72) Inventors: Denis Gudovskiy, Hayward, CA (US); Karthik Rajagopalan, Santa Clara, CA (US); Rizwan Ghaffar, San Jose, CA (US); Chuxiang Li, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/378,106

(22) Filed: Dec. 14, 2016

(65) Prior Publication Data

US 2018/0167237 A1 Jun. 14, 2018

(51) Int. Cl.
*H04L 25/02* (2006.01)
*H04L 5/00* (2006.01)
*H04L 25/03* (2006.01)
*H04W 24/02* (2009.01)
*H04B 7/0413* (2017.01)
(Continued)

(52) U.S. Cl.
CPC ....... *H04L 25/0236* (2013.01); *H04B 7/0413* (2013.01); *H04B 7/0456* (2013.01); *H04L 5/0048* (2013.01); *H04L 25/0256* (2013.01); *H04L 25/03993* (2013.01); *H04L 27/2695* (2013.01); *H04W 24/02* (2013.01); *H04L 27/2657* (2013.01); *H04L 2025/03624* (2013.01)

(58) Field of Classification Search
USPC .................................. 375/260; 370/338, 335
See application file for complete search history.

(56) References Cited

U.S. PATENT DOCUMENTS

| 8,780,941 B2 | 7/2014 | Dor et al. |
| 9,973,246 B2 * | 5/2018 | Forenza ............... H04B 7/0452 |

(Continued)

OTHER PUBLICATIONS

International Search Report based on Application No. PCT/US2017/060987 (3 Pages) dated Feb. 27, 2018, (Reference Purpose Only).

*Primary Examiner* — Wednel Cadeau
(74) *Attorney, Agent, or Firm* — Viering, Jentschura & Partner MBB

(57) ABSTRACT

What is disclosed is a method for wireless communication comprising receiving a wireless communication via a receiver of the mobile communication device, deriving a demodulation reference signal from a first plurality of symbols of the wireless communication; creating a channel estimation matrix using the demodulation reference signal; inverting the channel estimation matrix to obtain a channel pseudo-inverse matrix; deriving a tracking reference signal from a second plurality of symbols of the wireless communication; calculating a phase shift for one or more additional symbols based on the tracking reference signal; determining a corrected channel pseudo-inverse matrix for the one or more additional symbols by adjusting the channel pseudo-inverse matrix according to the calculated phase shift; and controlling the receiver to accomplish data detection using the corrected channel pseudo-inverse matrix on one or more orthogonal frequency division multiplexing subcarriers.

19 Claims, 12 Drawing Sheets

(51) Int. Cl.
*H04B 7/0456* (2017.01)
*H04L 27/26* (2006.01)

(56) References Cited

U.S. PATENT DOCUMENTS

| | | | |
|---|---|---|---|
| 2002/0051433 A1* | 5/2002 | Affes | H04B 1/71052 |
| | | | 370/335 |
| 2009/0175367 A1* | 7/2009 | Kishigami | H04B 7/084 |
| | | | 375/260 |
| 2014/0064354 A1 | 3/2014 | Nakano et al. | |
| 2014/0098696 A1 | 4/2014 | Park | |
| 2015/0023279 A1 | 1/2015 | Tomeba et al. | |
| 2016/0043848 A1* | 2/2016 | Kim | H04L 5/0051 |
| | | | 370/280 |

\* cited by examiner

DATA DETECTION IN MIMO SYSTEMS WITH DEMODULATION AND TRACKING REFERENCE SIGNALS

TECHNICAL FIELD

This Disclosure relates generally to methods and devices for MIMO detection in wireless communication systems with phase tracking.

BACKGROUND

Linear detection or demodulation methods are methods for low complexity detection of spatially multiplexed multiple-input and multiple-output ("MIMO") systems. These methods typically include a zero-forcing ("ZF") technique and a minimum mean square error ("MMSE") technique. These detection methods require a computationally rigorous calculation. Moreover, in a MIMO system, the receiving component of a wireless communication generally performs a data detection for each orthogonal frequency division multiplexing ("OFDM") symbol in a subframe, which results in a frequently repeated, computationally complex calculation that demands significant computational resources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the Disclosure. In the following description, various aspects of the Disclosure are described with reference to the following drawings, in which.

DESCRIPTION

Figure 1:
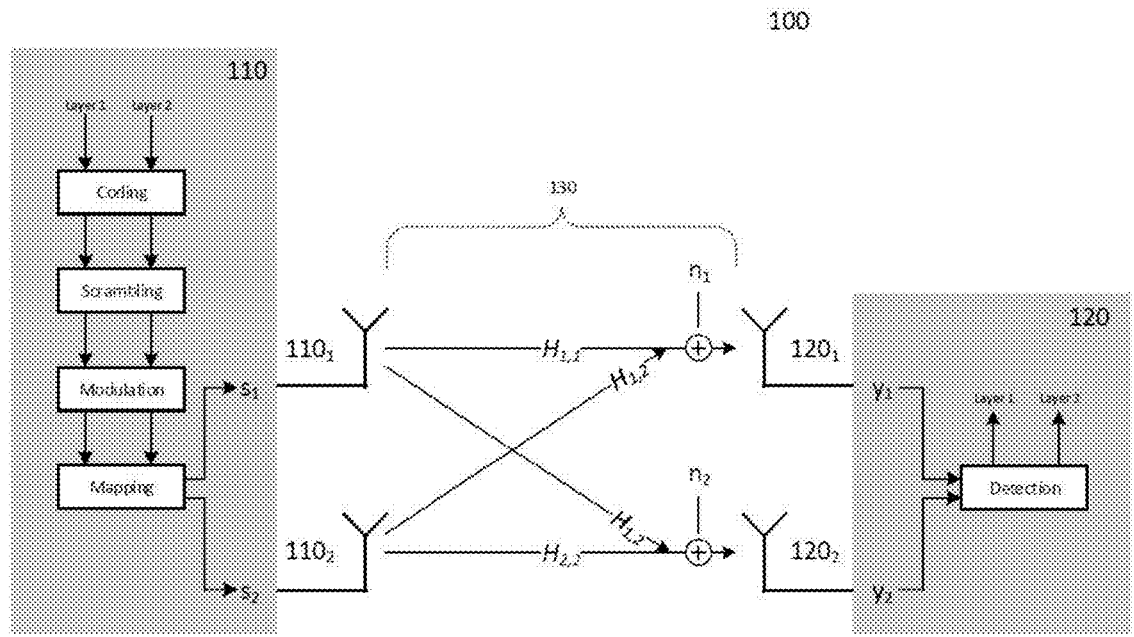
FIG. 1 shows a first arrangement for a MIMO transmission and reception system.

The following detailed description refers to the accompanying drawings that show, by way of illustration, specific details and aspects in which the Disclosure may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB ("Enb"), Home eNodeB, Remote Radio Head ("RRH"), relay point, etc., and may include base stations implemented with conventional base station architectures (e.g. distributed, "all-in-one", etc.) and base stations implemented with centralized base stations architectures (e.g. Cloud Radio Access Network ("Cloud-RAN") or Virtual RAN ("Vran")). As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access ("WiMax") (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced ("LTE-A"), CDMA, WCDMA, LTE-A, General Packet Radio Service ("GPRS"), Enhanced Data Rates for GSM Evolution ("EDGE"), High Speed Packet Access ("HSPA"), HSPA Plus ("HSPA+"), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network ("RAN") section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

MIMO Wireless Communication Systems

MIMO systems may employ multiple transmit and receive antennas to transmit multiple data layers on a shared MIMO channel, i.e. a set of shared time-frequency resources. Such MIMO systems may rely on the differing spatial channels between each of the transmit and receive antennas to allow the receiver to individually recover the transmitted data layers from the signals received at the received antennas, which may each be composed of contributions from each transmit antenna that have been altered by noise and other channel effects.

In a MIMO system, each transmit antenna may transmit a separate transmit symbol using the same shared time-frequency resources (e.g. using the same subcarrier or set of subcarriers during a common symbol period). Each receive antenna may then produce a separate receive symbol, where each receive symbol contains a contribution from each transmit symbol that has been altered by the spatial channel between the corresponding receive antenna and each transmit antenna. MIMO receivers may then process the receive symbols to recover the original transmit symbols, which may include applying channel equalization based on channel estimates of each spatial channel in order to individually detect each transmit symbol from the receive symbols. In a multi-subcarrier MIMO case such as for Orthogonal Frequency Division Multiple Access ("OFDMA") or Single Carrier Frequency Division Multiple Access ("SC-FDMA"), each MIMO transmit antenna may transmit a transmit symbol on each of a plurality of subcarriers that collectively compose the shared MIMO channel.

MIMO systems may employ multiple transmitters and/or multiple receivers and/or multiple transceivers, and accordingly may be characterized as Single-User MIMO ("SU-MIMO") or Multi-User MIMO ("MU-MIMO") systems. FIG. 1 shows MIMO system 100, which may be a basic 2×2 SU-MIMO system including MIMO transmitter 110 composed of two transmit antennas 110$_1$ and 110$_2$ and MIMO receiver 120 composed of two receive antennas 120$_1$ and 120$_2$. As MIMO channel 130 is shared between a single transmitter (110) and single receiver (120), MIMO system 100 may be classified as an SU-MIMO system.

As shown in FIG. 1, transmitter 110 may transmit two data layers (Layer 1 and Layer 2) on MIMO channel 130 to receiver 120. Transmitter 110 may apply channel coding, scrambling/interleaving, modulation, and antenna mapping on the original data layers to generate transmit symbols $s_1$ and $s_2$ that collectively compose transmit vector $s=[s_1\ s_2]^T$. Transmitter 110 may then transmit each of transmit symbols $s_1$ and $s_2$ via transmit antennas 110$_1$ and 110$_2$. Transmit symbols $s_1$ and $s_2$ may propagate through MIMO channel 130 and subsequently be received by receive antennas 120$_1$ and 120$_2$, which may subsequently produce receive symbols $y_1$ and $y_2$ constituting receive symbol vector $y=[y_1\ y_2]^T$. As shown in FIG. 1, both receive symbols $y_1$ and $y_2$ may contain contributions from both transmit symbols $s_1$ and $s_2$, which may be characterized by the channel matrix H of MIMO channel 130 where $H=[h_{1,1}\ h_{1,2};\ h_{2,1}\ h_{2,2}]$ and each $h_{i,j}$ for i,j=1,2 is a complex-valued term characterizing the wireless channel response between transmit antenna 110$_j$ and receive antenna $120_i$. Receiver 120 may recover the original data layers by applying MIMO detection on receive vector y.

Including the contribution from additive noise modeled as $n=[n_1\ n_2]^T$ in MIMO channel 130, MIMO system 100 may be modeled according to H, s, y, and n as follows:

$$y=Hs+n \quad (1)$$

MIMO system 100 and Equation (1) may be analogously expanded to any M×N MIMO system with N transmit antennas (and corresponding transmit symbol vector $s=[s_1, \ldots, s_N]^T$) and M receive antennas (and corresponding receive symbol vector $y=[y_1, \ldots, y_M]^T$), where H denotes the M×N complex channel matrix composed of complex channel response elements $h_{i,j}$, $i=1, \ldots, M$, $j=1, \ldots, N$, s denotes the complex transmitted symbol vector, n denotes the complex additive noise, and y denotes the complex received noisy symbol vector.

Figure 2:
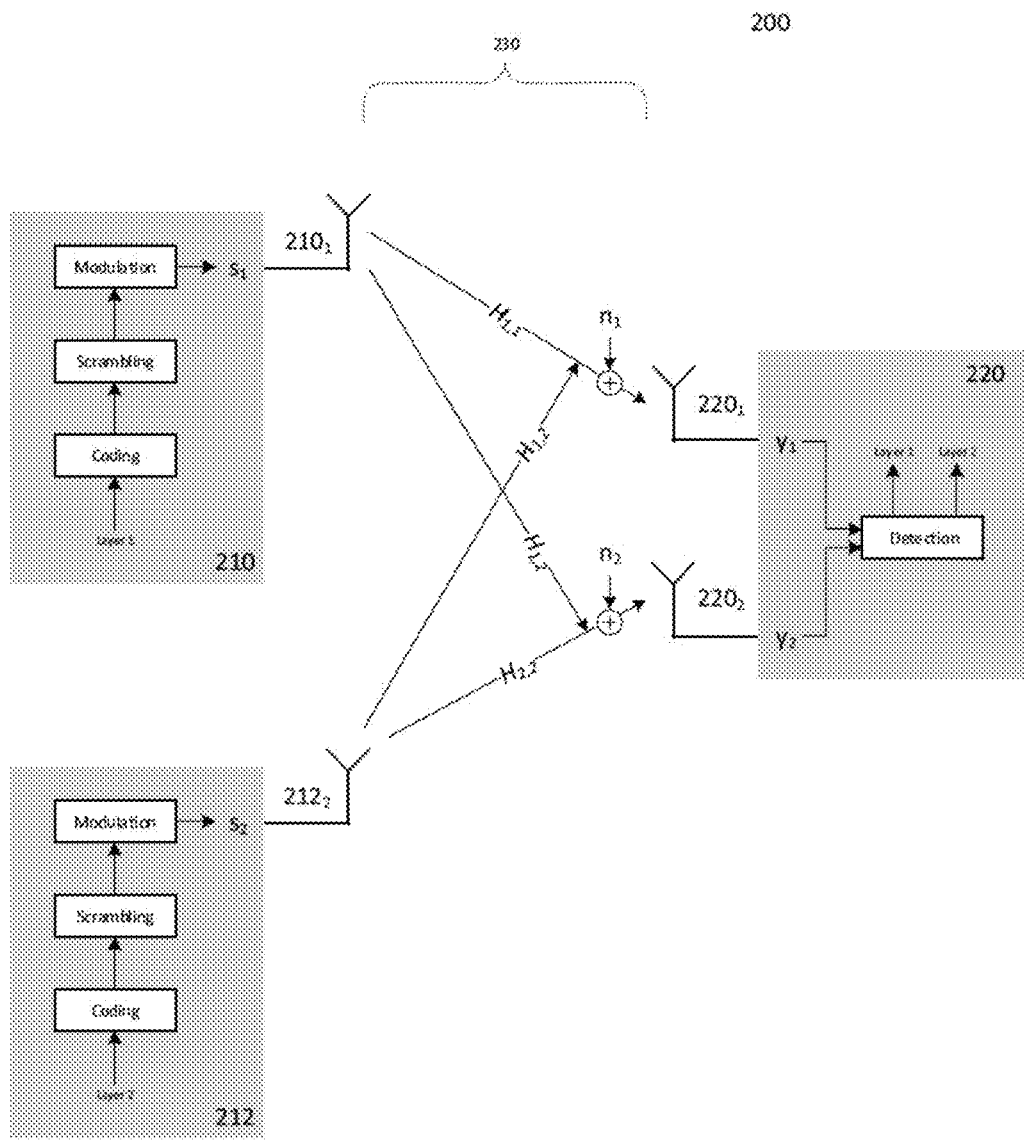
FIG. 2 shows a second arrangement for a MIMO transmission and reception system.

Equation (1) may similarly hold in a MU-MIMO system employing multiple transmitters and/or receivers. FIG. 2 depicts MIMO system 200, which may be an MU-MIMO system including two MIMO transmitters and one MIMO receiver. As opposed to a single transmitter and single receiver each with multiple respective transmit and receive antennas, MU-MIMO system 200 may include two MIMO transmitters 210 and 212 which may each transmit a respective data layer as $s_1$ and $s_2$ over transmit antennas $210_1$ and $212_2$, respectively. MIMO receiver 220 may then receive transmit symbols $s_1$ and $s_2$ as noisy receive symbols $y_1$ and $y_2$ following propagation over MIMO channel 230, and may similarly perform MIMO detection on y using a channel matrix H that characterizes MIMO channel 230 to recover the original data layers. Further variations including increasing the total number N and M of transmit and receive antennas (where M≥N), e.g. two transmit antennas at each of MIMO transmitters 210 and 212 and four receive antennas at MIMO receiver 220, reversing the direction (e.g. with a single MIMO transmitter and multiple MIMO receivers), and/or employing both multiple transmitters and multiple receivers to share the MIMO channel are also within the scope of the present disclosure.

As shown in FIGS. 1 and 2, MIMO transmitters may apply one or more of channel coding, scrambling/interleaving, modulation, and antenna mapping/precoding (for a MIMO transmitter with multiple transmit antennas) to the data layers prior to wireless MIMO transmission. The channel coding blocks of MIMO transmitters 110, 210, and 212 may receive a data layer and encode the data layer using a specific coding scheme to produce an encoded digital stream that may allow for a MIMO receiver to correct transmission errors. The scrambling/interleaving blocks may then perform interleaving and/or scrambling in order to re-arrange the bits of the encoded digital stream according to a specific scrambling/interleaving scheme. The modulation blocks may then receive the encoded and scrambled/interleaved digital stream and apply symbol mapping to convert the digital stream into a stream of complex modulation symbols, where each of the modulation symbols represents one or more bits of the encoded and scrambled/interleaved digital stream. If multiple transmit antennas are present, e.g. for MIMO transmitter 110, the antenna mapping block may apply an antenna mapping or precoding scheme to map each complex modulation symbol across the transmit antennas.

Figure 3:
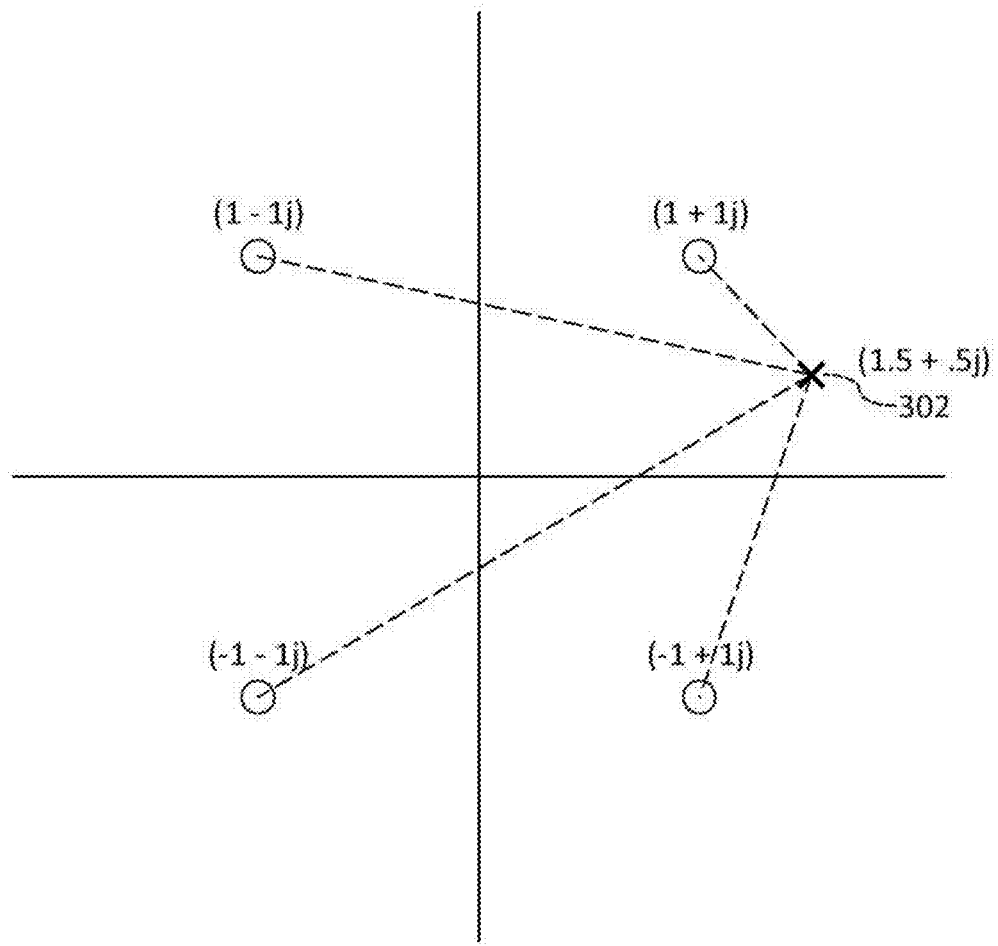
FIG. 3 shows a symbol constellation map.

Each transmit symbol $s_j$, $j=1, \ldots, N$, of s and receive symbol $y_i$, $i=1, \ldots, M$, of y may thus be a complex-valued symbol according to the particular modulation scheme employed by MIMO system 100, where the receive symbols of y may be corrupted by channel effects and noise. FIG. 3 shows constellation diagram 300 illustrating constellation points (+1−1j), (+1+1j), (−1−1j), and (−1+1j) for a 4-Quadrature Amplitude Modulation ("4-QAM") scheme, where each constellation point may be a complex number with a real and imaginary component. The set of constellation points may be denoted as constellation $\mathcal{M}$, where $\mathcal{M} = \{+1−1j, +1+1j, −1−1j, −1+1j\}$ for the 4-QAM scheme depicted in FIG. 3. An analogous set of constellation points $\mathcal{M}$ may similarly be given for any modulation scheme, where the particular constellation points of $\mathcal{M}$ will depend on the specific characteristics of the modulation scheme. Symbol vector s may thus be a vector of N symbols, where each symbol corresponds to a particular constellation point of $\mathcal{M}$, i.e. $s \in \mathcal{M}^N$.

A modulation block such as depicted in MIMO transmitters 110, 210, and 212 may receive a stream of digital input bits, partition the digital stream into blocks, and map each blocks to a constellation point to produce a corresponding complex symbol for each block. In the exemplary 4-QAM case depicted in FIG. 3, a modulator may partition a digital stream into two-bit blocks and map each two bit block ($b_1 b_2$) to constellation $\mathcal{M}$ as $$(00) \rightarrow (1+1j)$$
$$(01) \rightarrow (1-1j)$$
$$(10) \rightarrow (-1+1j)$$
$$(11) \rightarrow (-1-1j) \quad (2)$$

The modulator may thus map the digital input stream to a stream of complex modulation symbols, where each modulation symbol represents one or more bits of the digital input stream according to the block size. Such complex modulation symbols (after precoding, if applicable) may be subsequently modulated on in-phase and quadrature ("IQ") carriers according to the respective real and imaginary parts of each modulation symbol and transmitted as transmit vector s over the transmit antennas.

MIMO receivers such as MIMO receivers 120 and 220 may thus seek to recover the individual data layers of s from the noisy receive symbols of y obtained at receive antennas $120_i$. MIMO receiver 120/220 may perform such MIMO detection by applying a MIMO equalization ("EQ") filter derived from the channel estimates for the individual spatial channels of H. Specifically, MIMO receiver 120/220 may obtain a channel estimate for each spatial channel of H and generate a MIMO EQ filter that MIMO receiver 120/220 may apply to receive vector y in order to recover an estimate ŝ for s. Application of such a MIMO EQ filter may thus allow a MIMO receiver to isolate an estimate for each transmit symbol of s from the receive symbols of y, thus "detecting" the original transmit symbols and enabling MIMO receiver 120/220 to recover the original data layers.

MIMO receiver 120/220 may perform MIMO detection using any of a number of different algorithms.

Linear MIMO detectors such as zero-forcing ("ZF") and Minimum Mean Square Error ("MMSE") detectors may be used to perform MIMO detection. For such linear detectors, MIMO receiver 120/220 may obtain a MIMO EQ filter matrix W any apply W to y as follows to obtain estimated transmit vector ŝ as $$\hat{s} = Wy \quad (3)$$

where W is a matrix characterizing a linear filter operation.

ZF and MMSE detectors may differ in the selection of the linear transformation matrix W, which in both cases may involve a linear manipulation of channel matrix H. In a ZF and an MMSE detector, W is given as follows:

$$W^{ZF} = (H^H H)^{-1} H^H \quad (4)$$

$$W^{MMSE} = (H^H H + \sigma^2 I_N)^{-1} H^H \quad (5)$$

respectively, where $A^H$ denotes the Hermitian transpose of A, $\sigma^2$ is the noise variance, and $I_N$ denotes the N×N identity matrix. $W^{MMSE}$ may be written as either $W^{MMSE} = (H^H H + \sigma^2 I_N)^{-1} H^H$) or $W^{MMSE} = H^H (H^H H + N\sigma^2 I_N)^{-1}$.

Although either MMSE or ZF may be used for linear detection, they do not correct for phase shift, and therefore, and especially in a 5G context, they will yield results that must be subject to additional computation to assess and correct for phase shift.

Figure 4:
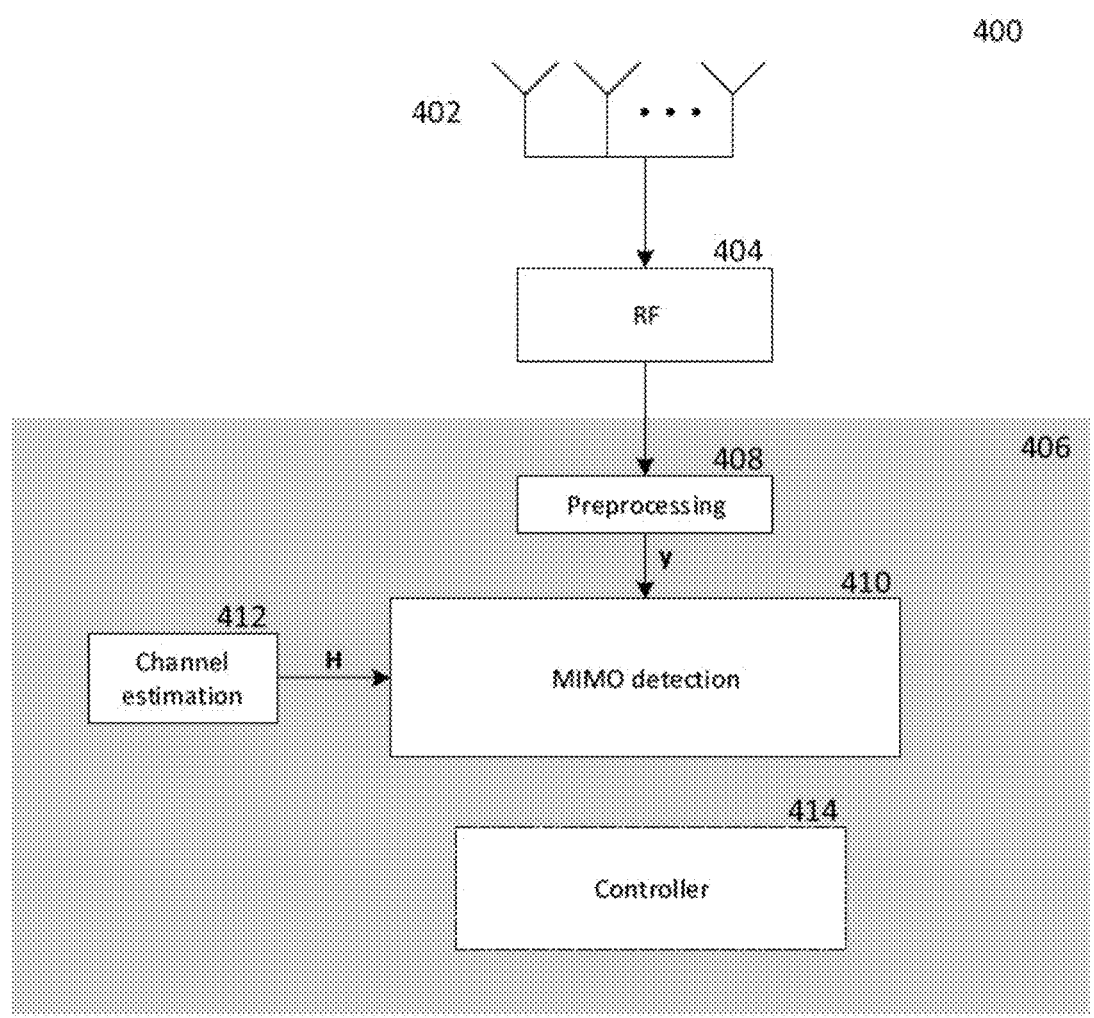
FIG. 4 shows a MIMO receiver device.

FIG. 4 shows an internal configuration of MIMO receiver 400. As shown in FIG. 4, MIMO receiver 400 may include antenna array 402, radio frequency ("RF Frontend") processing circuit 404, and baseband processing circuit 406, which may be composed of preprocessing circuit 408, MIMO symbol detection circuit 410, channel estimation circuit 412, and baseband control circuit 414.

MIMO receiver 400 may be realized in a wireless communication device. In a cellular communication context, MIMO receiver 400 may be implemented as either a downlink MIMO receiver or an uplink MIMO receiver. In a downlink MIMO receiver implementation, MIMO receiver 400 may be implemented at a mobile terminal and may receive downlink MIMO signals from one or more base stations over a cellular communication network, such as e.g. on a shared OFDM MIMO channel in which shared discrete subcarriers compose the MIMO channel. MIMO receiver 400 may thus be contained in a single device, e.g. a mobile phone or similar mobile terminal device. Alternatively, in an uplink MIMO receiver implementation, MIMO receiver 400 may be implemented at a base station and may receive uplink MIMO signals from one or more mobile terminals, e.g. on a shared Single Carrier Frequency Division Multiple Access ("SC-FDMA") MIMO channel that similarly employs shared discrete subcarriers for the MIMO channel after uplink SC-FDMA symbols have been spread across the shared subcarriers. In such an uplink MIMO context, MIMO receiver 400 may be implemented as part of a distributed base station architecture where the individual components of MIMO receiver 400 depicted in FIG. 4 may be distributed between an antenna array (containing antenna array 402), a Remote Radio Unit (RRU; containing RF processing circuit 404 and optionally preprocessing circuit 408), and a Baseband Unit (BBU; containing baseband processing circuit 406 optionally absent preprocessing circuit 408). MIMO receiver 400 may alternatively be implemented as part of a Cloud-RAN base station architecture in which baseband processing circuit 406 is implemented at a centralized location serving numerous the RRUs from numerous different base stations. MIMO receiver 400 as detailed herein is thus not limited to any particular uplink/downlink context or device architecture. MIMO receiver 400 may include one or more additional components such as additional hardware, software, or firmware elements including processors/microprocessors, controllers/microcontrollers, memory, other specialty or generic hardware/processors/circuits, etc., in order to support a variety of additional operations. In particular in the context of a mobile terminal device, MIMO receiver 400 may be included in a mobile terminal device that also includes a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc., which may be further controlled by a central processing element such as a mobile Application Processor ("AP").

Expanding on the abridged description presented above regarding MIMO receiver operation of receiver 120/220, MIMO receiver 400 may be configured to receive wireless signals, such as according to a particular network access protocol or radio access technology ("RAT") including any of LTE, WLAN/WiFi, UMTS, GSM, Bluetooth, CDMA. W-CDMA, etc. Antenna array 402 be composed of M antennas in accordance with an M×N MIMO system, where each antenna may receive wireless radio frequency signals and provide resulting electrical signals to RF processing circuit 404. RF processing circuit 404 may include various reception circuitry components, which may include analog circuitry configured to process externally received signals such as e.g. mixing circuitry to convert externally received RF signals to baseband and/or intermediate frequencies. RF processing circuit 404 may also include amplification circuitry to amplify externally received signals, such as power amplifiers ("PAs") and/or Low Noise Amplifiers ("LNAs"). RF processing circuit 404 may be a transceiver component, and accordingly may also be configured to transmit wireless signals via antenna array 402 including e.g. MIMO transmission. However, for purposes of explanation the receive chain will be of primary focus herein.

Baseband processing circuit 406 may be configured to establish and support connections with one or more network terminals (e.g. mobile terminals or base stations depending on an uplink or downlink context) by transmitting and receiving wireless signals over a particular wireless communication network according to corresponding network protocols. Baseband control circuit 414 may be configured to control the various components of baseband processing circuit 406 according to particular protocol stack of the wireless communication network, and accordingly baseband control circuit 414 may be protocol processor (e.g. microprocessor) configured to execute protocol stack software and/or firmware modules by retrieving corresponding program code from a baseband memory (not explicitly shown in FIG. 4) and operate in accordance with control logic provided by the protocol stack software and/or firmware modules. Baseband control circuit 414 may thus be configured to execute Layer 1 (Physical or "PHY" layer), Layer 2, and Layer 3 protocol stack software and/or firmware modules and may further control other components of baseband processing circuit 406 including PHY layer hardware of MIMO detection circuit 410, channel estimation circuit 412, preprocessing circuit 408, RF transceiver 404, and antenna array 402 in accordance with the protocol stack software and/or firmware modules.

RF processing circuit 404 may provide baseband processing circuit 406 with M separate analog data streams, where each i-th data stream corresponds to the i-th antenna of antenna array 402. Baseband processing circuit 406 may first preprocess the M analog data streams at preprocessing circuit 408, which may include analog-to-digital conversion and preliminary demodulation to produce receive vector y. In a multi-subcarrier MIMO context, preprocessing circuit 408 may produce a receive vector y for each subcarrier, where each receive vector y contains the noisy receive symbols received on the corresponding subcarrier. For example, in an LTE context preprocessing circuit 408 may apply a Fast Fourier Transform ("FFT") as part of the preliminary demodulation processing for OFDM (downlink) or SC-FDMA (uplink). As OFDM and SC-FDMA MIMO may include sharing multiple discrete subcarriers that each contain a transmit symbol, preprocessing circuit 408 may produce a separate receive vector y containing M complex noisy received symbols for each subcarrier shared as part of the MIMO channel. Accordingly, the relationship of Equation (1) may be re-expressed as $$y_k = H_k s_k + n_k, k=1, \ldots, N_{SC} \tag{6}$$

where $N_{SC}$ is the number of subcarriers of the shared MIMO channel (e.g. where $N_{sc}=1$ in a single subcarrier case or $N_{SC}>1$ in a multi-subcarrier case) and $y_k$, $H_k$, $s_k$, and $n_k$ respectively are the receive vector, channel matrix, transmit vector, and noise vector for the k-th subcarrier of the shared MIMO channel. MIMO receiver 400 may thus apply MIMO detection to the receive vector $y_k$ for each subcarrier to recover an estimate $\hat{s}_k$ for the original transmit symbols transmitted by the MIMO transmitters on each subcarrier. While the following description assumes the same number of data layers per MIMO subcarrier, such may be further configured to utilize different numbers of data layers per MIMO subcarrier.

MIMO detection circuit 410 may thus apply MIMO detection to the receive vector $y_k$ for each subcarrier to recover an estimate $\hat{s}_k$ for the original transmit symbols transmitted by the MIMO transmitters on each subcarrier, thus allowing MIMO detection circuit 410 to recover the original data layers as transmitted by the MIMO transmitters. As receive vector $y_k$ includes complex symbols from a single symbol period, preprocessing circuit 408 may produce such a receive vector $y_k$ for each symbol period (for each subcarrier) over an extended duration of symbol periods to reflect continuing reception of MIMO signals by antenna array 402 and RF transceiver 404. MIMO receiver 400 may thus continuously perform decoding of each received vector $y_k$ over an extended period of time as detailed below for receive vectors $y_k$ in a single symbol period.

MIMO Channel Estimation

Figure 5:
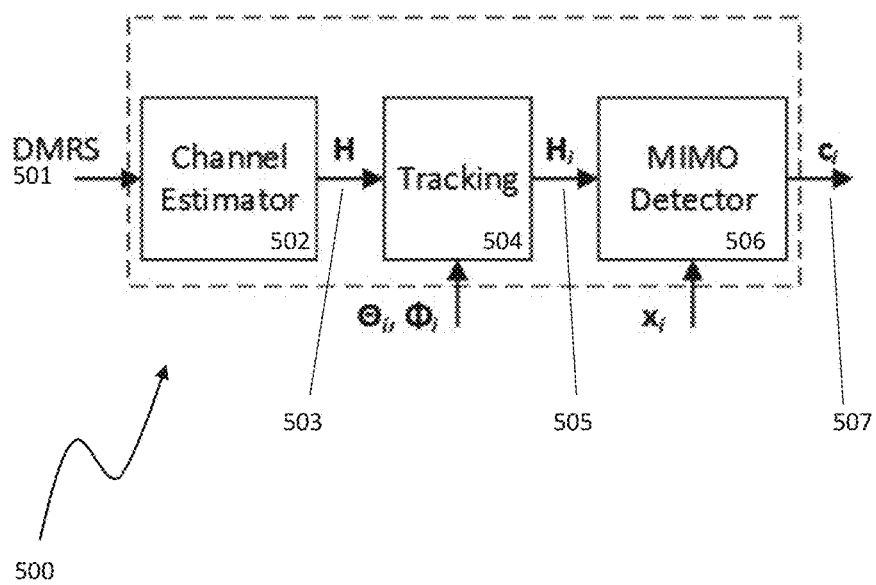
FIG. 5 shows a conventional method of MIMO detection for systems with tracking information.

FIG. 5 500 shows a conventional method of channel estimation and symbol detection in a MIMO system with tracking. According to this method, the DMRS 501 is transmitted in a wireless communication. The DMRS 501 is received by the channel estimator 502, which assesses the DMRS 501 and outputs a channel estimate matrix ("H") 503, of $H \in \mathbb{C}^{N_r \times N_t}$, where $N_r$ is the number of receive antenna ports and $N_t$ is the number of transmit antenna ports (number of MIMO layers). The tracking block 504 rotates the channel estimate matrix H 503 by an estimated rotation matrix $\Theta_i$, which is outputted as $H_i$ 505. The MIMO detector 506 then equalizes received symbols $x_i \in \mathbb{C}^{N_r \times 1}$ in order to estimate transmitted symbols (QAM constellations) $c_i \in \mathbb{C}^{N_t \times 1}$ 507. Mathematically, MIMO system for each symbol at the input of receiver can be expressed as $$x = \begin{bmatrix} x_1 \\ \vdots \\ x_{N_r} \end{bmatrix} = \begin{bmatrix} h_{11} & \cdots & h_{1N_t} \\ \vdots & \ddots & \vdots \\ h_{N_r 1} & \cdots & h_{N_r N_t} \end{bmatrix} \begin{bmatrix} c_1 \\ \vdots \\ c_{N_t} \end{bmatrix} + \begin{bmatrix} n_1 \\ \vdots \\ n_{N_r} \end{bmatrix} = Hc + n \tag{7}$$

where $n \in \mathbb{C}^{N_r \times 1}$ is a noise vector.

In 5G discussions, a tracking reference signal ("TRS"), sometimes referred as Phase Noise Compensation Reference Signal, is being considered. This TRS allows for the tracking of the changing phase of the signal, where the main contributor of the changing phase is phase noise. Hence, the channel estimate at i-th OFDM symbol $\hat{H}_i$ is given by $$\hat{H}_i = \hat{H} \cdot \hat{\Theta}_i = \begin{bmatrix} \hat{h}_{11} e^{j\hat{\theta}_1(i)} & \cdots & \hat{h}_{1N_t} e^{j\hat{\theta}_{N_t}(i)} \\ \vdots & \ddots & \vdots \\ \hat{h}_{N_r 1} e^{j\hat{\theta}_1(i)} & \cdots & \hat{h}_{N_r N_t} e^{j\hat{\theta}_{N_t}(i)} \end{bmatrix} \tag{8}$$

where $\hat{H}$ is rotated by a TRS matrix $\hat{\Theta}_i$ of complex exponentials $$e^{j\hat{\theta}_{n_t}(i)}$$

and "∘" denotes the Hadamard product. Note that in other cases, $\hat{\Theta}_i$ may not be limited to a matrix of complex exponentials. Finally, conventional ZF and MMSE MIMO detectors calculate $$\hat{c}_{i_{ZF}} = (\hat{H}_i^H \hat{H}_i)^{-1} \hat{H}_i^H x_i \tag{9}$$

$$\hat{c}_{i_{MMSE}} = (\hat{H}_i^H \hat{H}_i + \hat{N}_0 I)^{-1} \hat{H}_i^H x_i \tag{10}$$

where $\hat{N}_0$ is an estimated noise power (assuming it is the same for all received antenna ports), I is an identity matrix, and "$()^H$" denotes Hermitian (conjugate) transpose. Note that ZF detector in Eq. (9) is equivalent to MMSE detector in Eq. (10) when $\hat{N}_0 = 0$.

MIMO Channel Estimation Using Tracking Data

Figure 6:
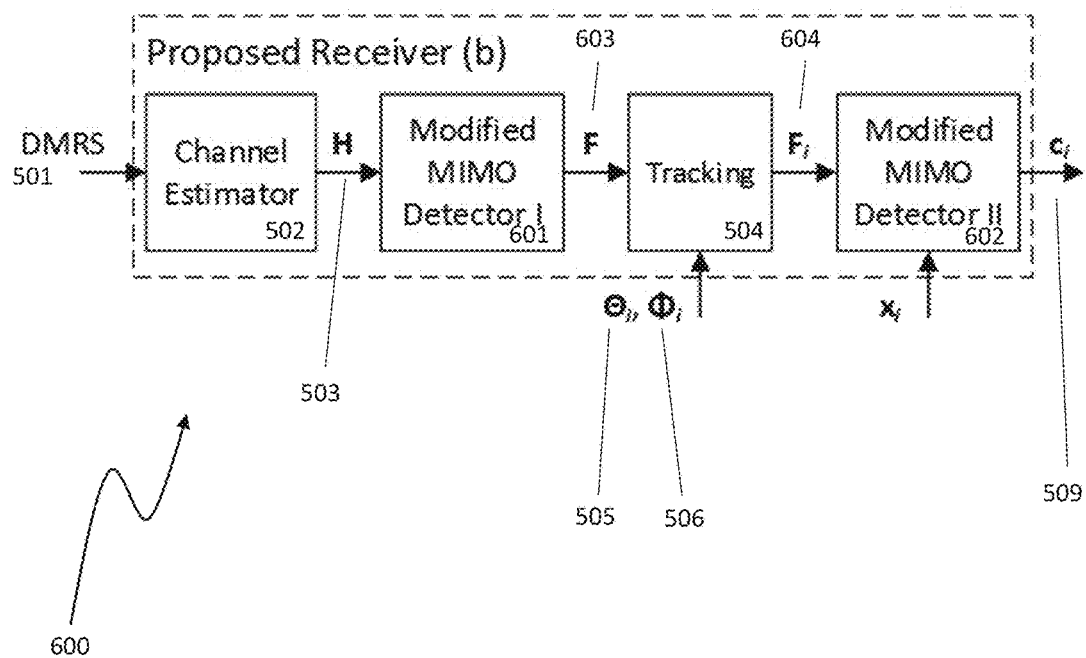
FIG. 6 shows a method of MIMO detection whereby partial MIMO detection is performed before assessment of tracking.

FIG. 6, 600 shows a modified method of, and apparatus for, channel estimation and symbol detection, according to an aspect of the Disclosure. According to this method and/or apparatus, the DMRS 501 is transmitted in a wireless communication. The DMRS 501 is received by the channel estimator 502, which assesses the DMRS 501 and outputs a channel estimate matrix ("H") 503. A modified MIMO Detector I 601 assesses H and calculates a pseudo inverse to determine F 603, where $$F = (\hat{H}^H \hat{H} + \hat{N}_0 I)^{-1} \hat{H}^H \tag{11}$$

The tracking block 504 assesses the tracking signals and determines a phase shift, and rotates F to correct for the phase shift, where the corrected F is $F_i$ 604, and where $F_i$ is $$F_i = \hat{\Theta}_i^H F \tag{12}$$

The resulting $F_i$ 604 along with received symbol $x_i$ is assessed by the Modified MIMO Detector II 602, which outputs a detected symbol $c_i$ 509. This results in a novel method to solve a linearized system with tracking property using either ZF or MMSE techniques described in, respectively, Eq.(9) and Eq.(10) by moving the most computationally expensive operations before tracking block 504. The exact method of this operation is somewhat dependent on the configuration of the system, and specifically whether the transmitters and/or receivers are synchronous, and therefore it can be described in greater detail as follows.

Transmitter and Receiver Synchronization-Specific Adaptations

In systems with synchronous receivers and asynchronous transmitters, such as a downlink scenario when receiver has $N_r$ synchronized receive antenna ports and transmitters have $N_t$ asynchronous antenna ports, Eq.(8) can be rewritten as matrix multiplication as follows:

$$\hat{H}_i = \hat{H} \hat{\Theta}_i \tag{13}$$

where $\hat{\Theta}_i$ is a square diagonal matrix with main diagonal $$[e^{j\vartheta_1(i)}, e^{j\vartheta_2(i)}, \ldots e^{j\vartheta_{N_t}(i)}]^T.$$

Since $\hat{\Theta}_i$ is unitary ($\hat{\Theta}_i^{-1} = \hat{\Theta}_i^H$), a reduced-complexity solution can be found as $$c_i = (\hat{\Theta}_i^H \hat{H}^H \hat{H} \hat{\Theta}_i + \hat{N}_0 I)^{-1} \hat{\Theta}_i^H \hat{H}^H x_i = \qquad (14)$$

$$\hat{\Theta}_i^H \underbrace{(\hat{H}^H \hat{H} + \hat{N}_0 I)^{-1} \hat{H}^H}_{F} x_i = \underbrace{\hat{\Theta}_i^H F}_{F_i} x_i = F_i x_i,$$

where F is calculated once (once per subframe for 5G systems) using a modified MIMO detector that is subdivided into $1^{st}$ F-calculation part, $2^{nd}$ $\hat{c}_i$-calculation part and a modified tracking block in between that calculates $F_i$.

In systems with asynchronous receivers and synchronous transmitters, such as in some uplink scenarios, the receiver may have $N_r$ asynchronous (distributed) receive antenna ports and the transmitters may have $N_t$ synchronized antenna ports. Under these circumstances, the estimated channel matrix can be written as $$\hat{H}_i = \hat{\Phi}_i \hat{H} \qquad (15)$$

where $\hat{\Phi}_i$ is a square diagonal matrix with main diagonal $$[e^{j\varphi_1(i)}, e^{j\varphi_2(i)}, \ldots e^{j\varphi_{N_r}(i)}]^T.$$

Using similar approach, a reduced-complexity solution can be found as $$\hat{c}_i = (\hat{H}^H \hat{\Phi}_i^H \hat{\Phi}_i \hat{H} + \hat{N}_0 I)^{-1} \hat{H}^H \hat{\Phi}_i^H x_i = \qquad (16)$$

$$\underbrace{(\hat{H}^H \hat{H} + \hat{N}_0 I)^{-1} \hat{H}^H}_{F} \hat{\Phi}_i^H x_i = \underbrace{F \hat{\Phi}_i^H}_{F_i} x_i = F_i x_i.$$

In systems with asynchronous receivers and asynchronous transmitters, then by combining equations (13) and (15), $$\hat{H}_i = \hat{\Phi}_i \hat{H} \hat{\Theta}_i, \qquad (17)$$

and a general reduced-complexity solution can be found as $$\hat{c}_i = \underbrace{\hat{\Theta}_i^H F \hat{\Phi}_i^H}_{F_i} x_i = F_i x_i, \qquad (18)$$

Noise-Balancing Detection Adaptations

Where the MMSE detector is a Noise-Balanced MMSE detector, a slight modification may be used. The assumption in Eq. (10) that noise power is equal among all receive antenna ports is not always true. Hence, the estimated noise power $\hat{N}_0$ should be replaced with diagonal matrix $\hat{\mathbf{N}}_0$ of noise power estimates for $N_r$ receive antenna ports with main diagonal $[\hat{N}_{0(1)}, \hat{N}_{0(2)}, \ldots \hat{N}_{0(N_r)}]^T$. Since $\hat{\mathbf{N}}_0$ is diagonal, the general reduced-complexity solution in Eq. (18) holds true and can be written as $$\hat{c}_i = \hat{\Theta}_i^H F \hat{\Phi}_i^H x_i = \hat{\Theta}_i^H \{(\hat{H}^H \hat{\mathbf{N}}_0^{-1} \hat{H} + I)^{-1} \hat{H}^H \hat{\mathbf{N}}_0^{-1}\} \hat{\Phi}_i^H x_i. \qquad (19)$$

Moreover, all reduced-complexity solutions in Eq. (14) and (18) hold true as well.

Using matrix inversion lemma, an alternative form of reduced-complexity solution for Eq. (19) can be written as $$\hat{c}_i = \hat{\Theta}_i^H F \hat{\Phi}_i^H x_i = \hat{\Theta}_i^H \{\hat{H}^H (\hat{H} \hat{H}^H + \hat{\mathbf{N}}_0)^{-1}\} \hat{\Phi}_i^H x_i. \qquad (20)$$

Where the MMSE detector is an MMSE-Interference Rejection Combining ("IRC" or "MMSE-IRC") detector or enhanced MMSE-IRC detector with Network Assisted Interference Cancellation/Suppression ("NAICS"), an additional term must be added to represent the estimated covariance matrix of interference plus noise from the j-th interfering transmitted and subject to the same rotations by matrices $\hat{\Theta}_i(j)$ and $\hat{\Phi}_i$, which can be written as $$\hat{R}_i = \hat{\Phi}_i \left( \sum_j \hat{H}(j) \hat{\Theta}_i(j) \hat{\Theta}_i^H(j) \hat{H}^H(j) + \hat{\mathbf{N}}_0 \right) \hat{\Phi}_i^H = \qquad (21)$$

$$\hat{\Phi}_i \underbrace{\left( \sum_j \hat{H}(j) \hat{H}^H(j) + \hat{\mathbf{N}}_0 \right)}_{R} \hat{\Phi}_i^H = \hat{\Phi}_i R \hat{\Phi}_i^H.$$

Hence, by incorporating this new term into Eq. (19)-(20), the general reduced-complexity solution for MMSE-IRC detector can be written as $$\hat{c}_i = \hat{\Theta}_i^H F \hat{\Phi}_i^H x_i = \hat{\Theta}_i^H \{(\hat{H}^H \hat{R}^{-1} \hat{H} + I)^{-1} \hat{H}^H \hat{R}^{-1}\} \hat{\Phi}_i^H x_i. \qquad (22)$$

$$\hat{c}_i = \hat{\Theta}_i^H F \hat{\Phi}_i^H x_i = \hat{\Theta}_i^H \{\hat{H}^H (\hat{H} \hat{H}^H + \hat{R})^{-1}\} \hat{\Phi}_i^H x_i, \qquad (23)$$

Figure 7:
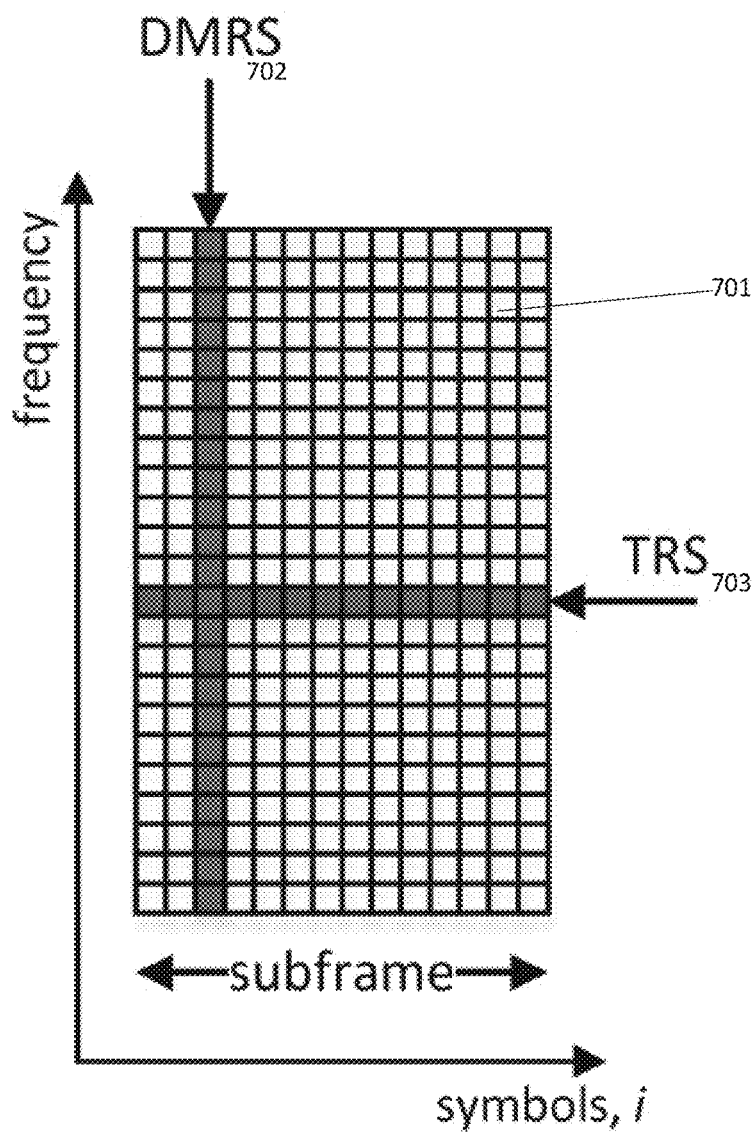
FIG. 7 shows a subframe with a single demodulation reference signal ("DMRS") transmission and a tracking reference signal ("TRS") over time.

In FIG. 7, a radio communication subframe 700 is depicted, wherein said subframe comprises a plurality of rows and columns, each of which further comprise a plurality of OFDM symbols 701. This figure shows the DMRS 702 being transmitted vertically across subcarriers once per subframe. This figure further shows a TRS 703 being transmitted over time across a subcarrier.

Figure 8:
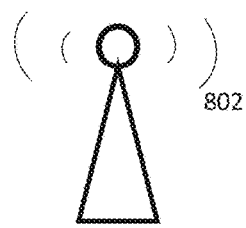
FIG. 8 shows an apparatus for radio communication.
Figure 8:
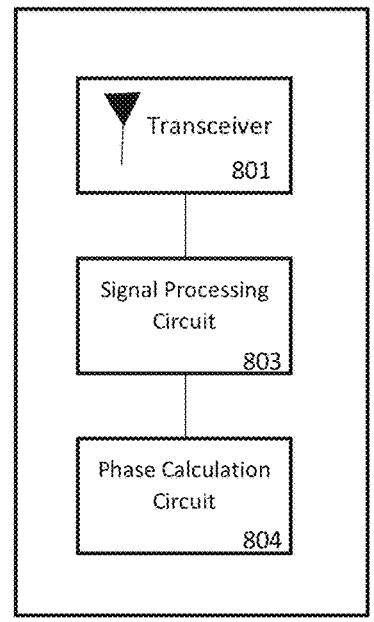
Figure 8:
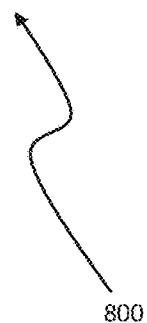

FIG. 8 shows an apparatus for wireless communication, said apparatus comprising an transceiver 801, configured to receive a wireless communication 802, wherein the wireless communication further comprises a demodulation reference signal and a tracking reference signal; a signal processing circuit 803 configured to create a channel estimation matrix for the wireless communication; and a phase calculation circuit 804 configured to calculate a phase shift of the wireless communication using a tracking reference signal; wherein the signal processing circuit 803 creates a channel estimation matrix based on the received demodulation reference signal and inverts the channel estimation matrix to obtain a channel pseudo-inverse matrix; wherein the phase calculation circuit 804 calculates a phase shift for one or more additional symbols based on the tracking reference signal and determines a corrected channel pseudo-inverse matrix by adjusting the channel pseudo-inverse matrix according to the calculated phase shift; and wherein the signal processing circuit 803 performs data detection on one or more orthogonal frequency division multiplexing subcarriers using the corrected channel pseudo-inverse matrix.

Figure 9:
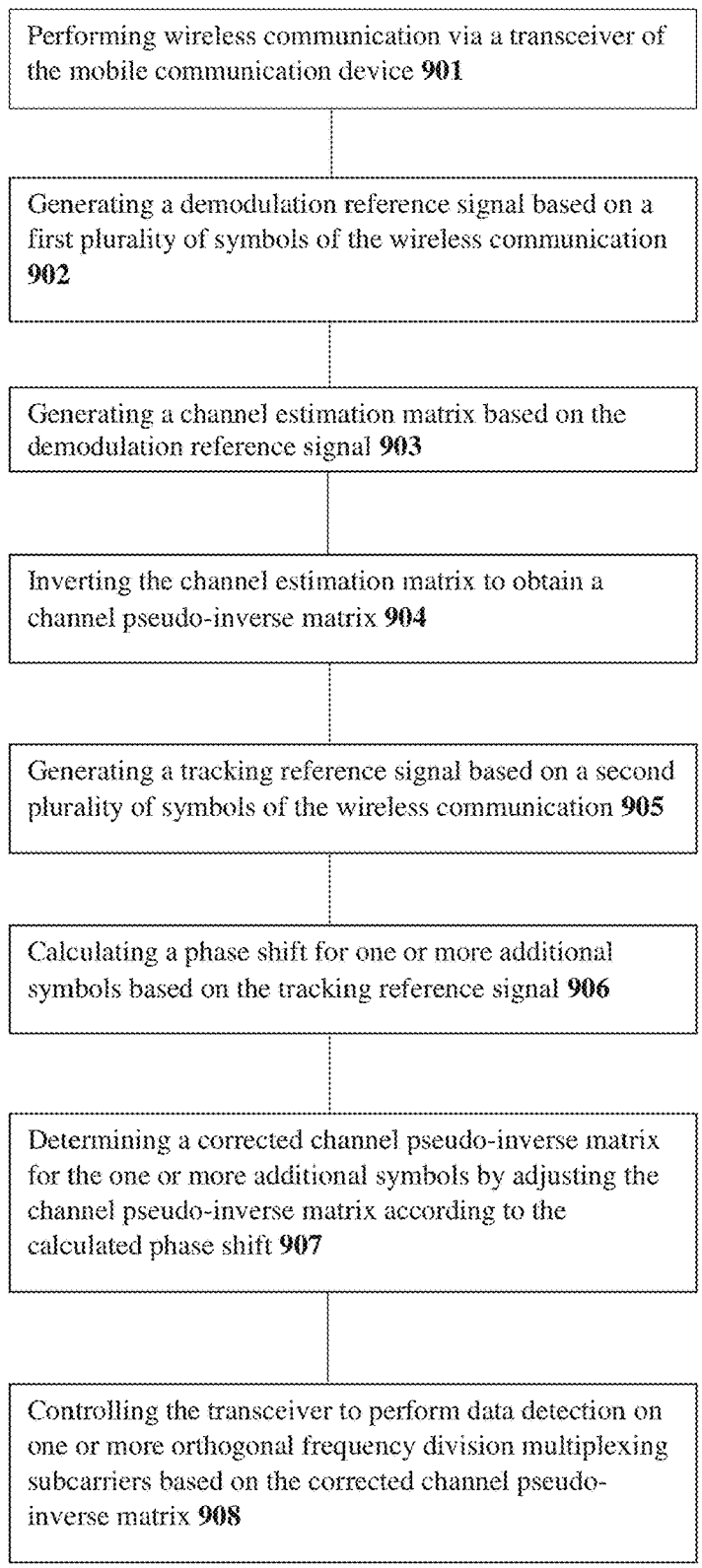
FIG. 9 shows a method for radio communication.

FIG. 9 shows a method adapted for performing MIMO detection in a mobile communication device 900, said method comprising performing wireless communication via a transceiver of the mobile communication device 901; generating a demodulation reference signal based on a first plurality of symbols of the wireless communication 902; generating a channel estimation matrix based on the demodulation reference signal 903; inverting the channel estimation matrix to obtain a channel pseudo-inverse matrix

904; generating a tracking reference signal based on a second plurality of symbols of the wireless communication 905; calculating a phase shift for one or more additional symbols based on the tracking reference signal 906; determining a corrected channel pseudo-inverse matrix for the one or more additional symbols by adjusting the channel pseudo-inverse matrix according to the calculated phase shift 907; and controlling the transceiver to perform data detection on one or more orthogonal frequency division multiplexing subcarriers based on the corrected channel pseudo-inverse matrix 908.

Figure 10:
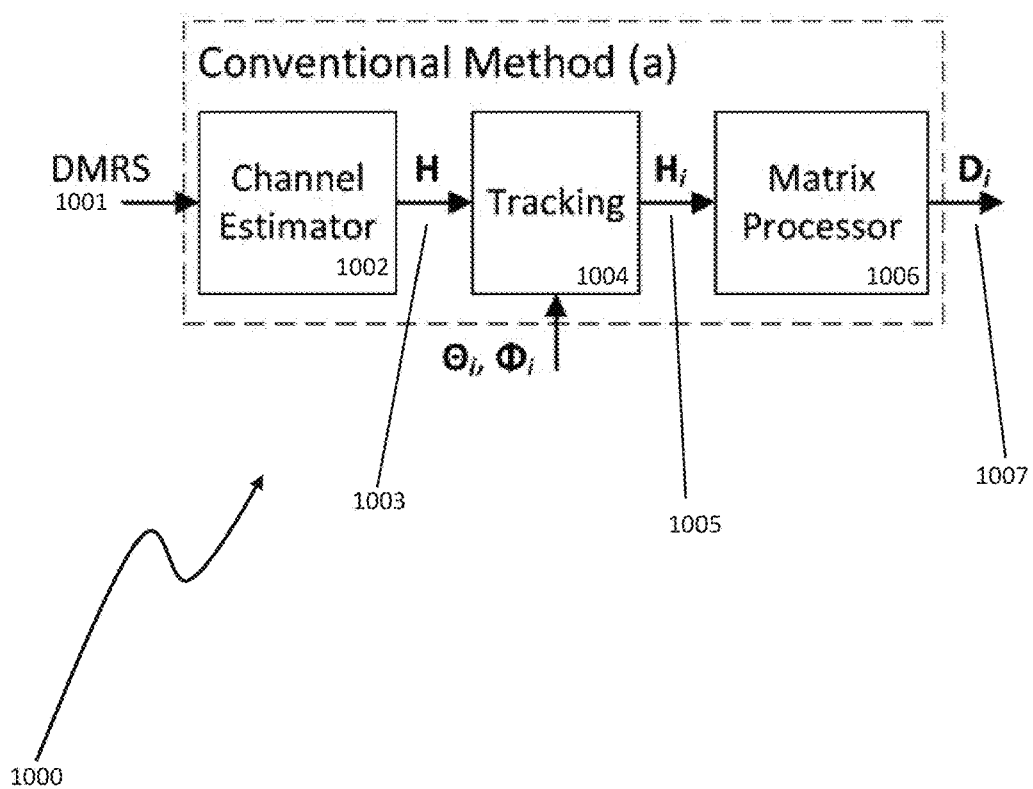
FIG. 10 shows a conventional system for matrix decompensation.

FIG. 10 shows a conventional method of matrix decomposition in a MIMO system with tracking. According to this method, the DMRS 1001 is transmitted in a wireless communication. The DMRS 1001 is received by the channel estimator 1002, which assesses the DMRS 1001 and outputs a channel estimate matrix ("H") 1003, of $H \in \mathbb{C}^{N_r \times N_t}$, where $N_r$ is the number of receive antenna ports and $N_t$ is the number of transmit antenna ports (number of MIMO layers). The tracking block 1004 rotates the channel estimate matrix H 1003 by an estimated rotation matrix $\Theta_i$, which is outputted as $H_i$ 1005. The Matrix Processor 1006 then equalizes received symbols $x_i \in \mathbb{C}^{N_r \times 1}$ in order to estimate transmitted symbols (QAM constellations) $c_i \in \mathbb{C}^{N_r \times 1}$ which are output as $D_i$ 1007.

Figure 11:
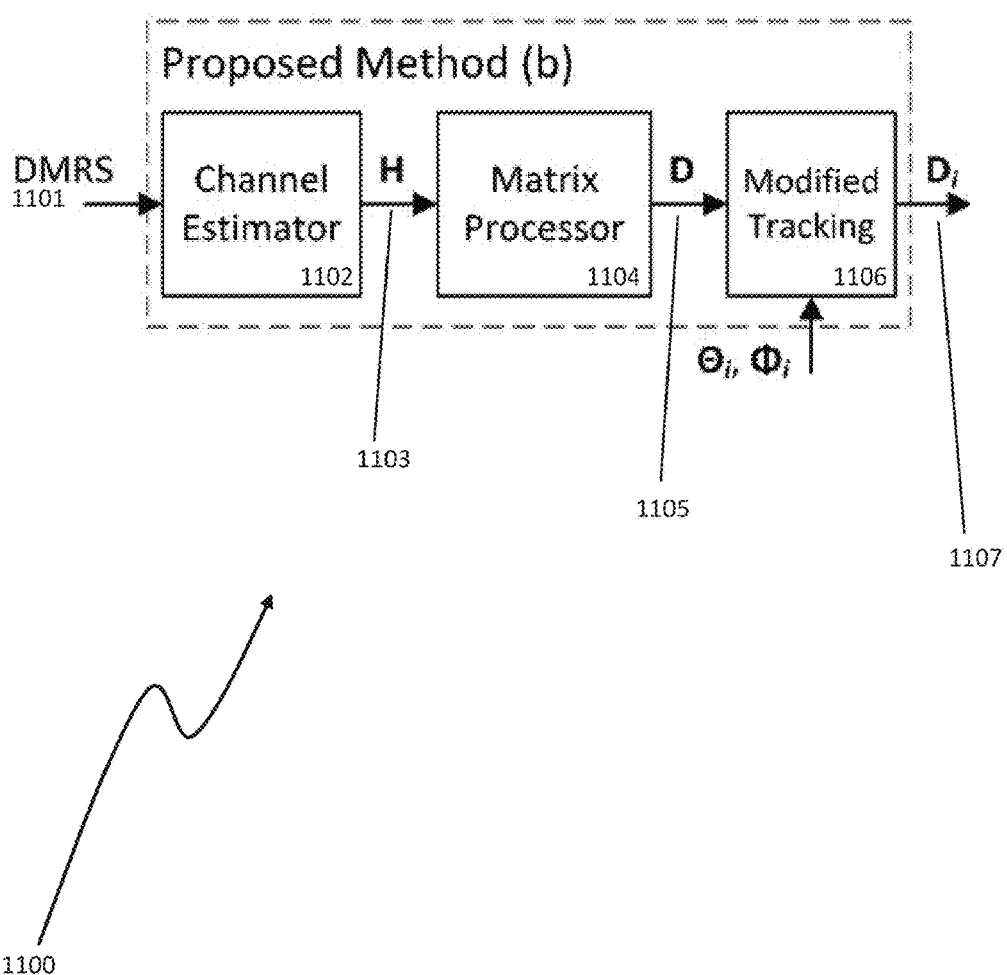
FIG. 11 shows a system for matrix decompensation with tracking information.

FIG. 11 shows a modified method of, and apparatus for, matrix decomposition 1100, according to an aspect of the Disclosure. According to this method and/or apparatus, the DMRS 1101 is transmitted in a wireless communication. The DMRS 1101 is received by the channel estimator 1102, which assesses the DMRS 1001 and outputs a channel estimate matrix ("H") 1103. A matrix processor 1104 assesses H 1103 and calculates a decomposed matrix to determine D 1105. The modified tracking block 1106 assesses the tracking signals and determines a phase shift, and rotates D to correct for the phase shift, where the corrected D 1105 is $D_i$ 1107.

Figure 12:
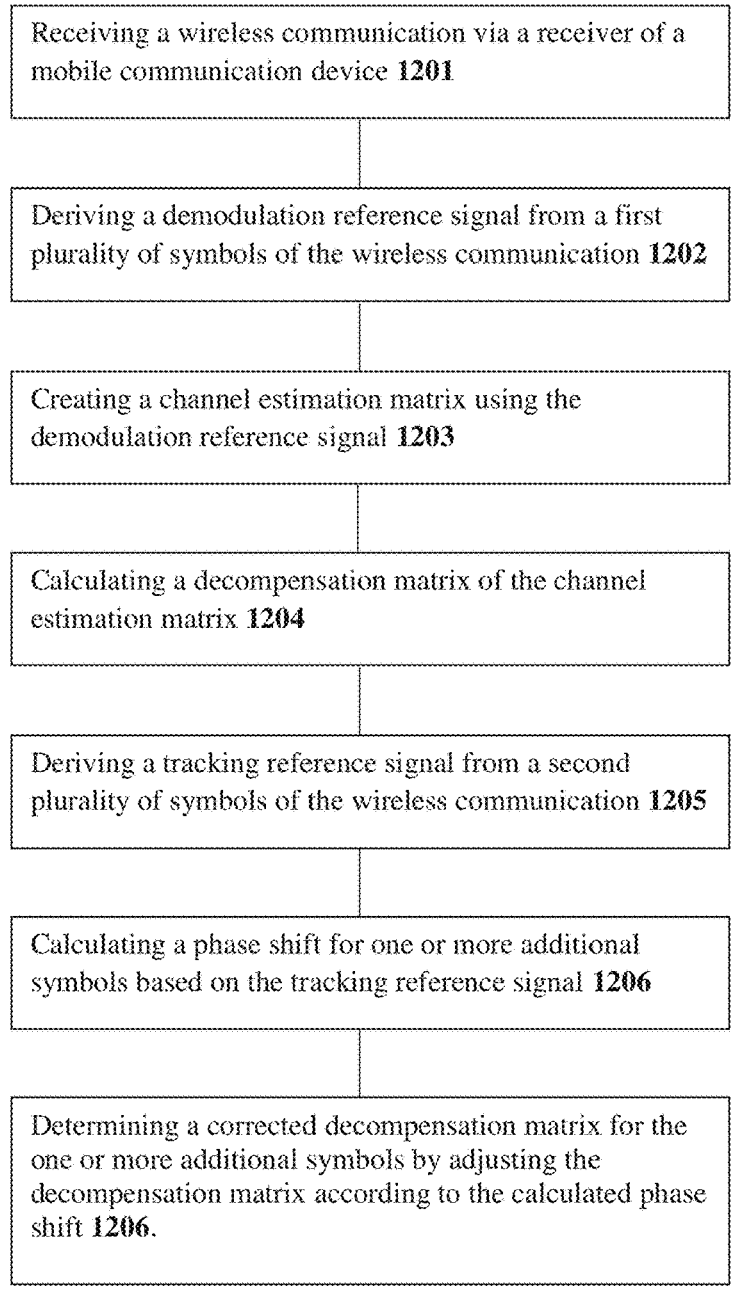
FIG. 12 shows a method for matrix decomposition with tracking information.

FIG. 12 shows a method of performing matrix decomposition in a multiple-input multiple-output system with tracking 1200, said method comprising receiving a wireless communication via a receiver of a mobile communication device 1201;
deriving a demodulation reference signal from a first plurality of symbols of the wireless communication 1202;
creating a channel estimation matrix using the demodulation reference signal 1203;
calculating a decompensation matrix of the channel estimation matrix 1204;
deriving a tracking reference signal from a second plurality of symbols of the wireless communication 1205;
calculating a phase shift for one or more additional symbols based on the tracking reference signal 1205; and determining a corrected decompensation matrix for the one or more additional symbols by adjusting the decompensation matrix according to the calculated phase shift 1206.

5G Development and Impact on MIMO Tracking and Detection

Among the advances in wireless communication is 5$^{th}$ Generation Mobile Technology ("5G"). Although 5G is currently in development, and the standards for 5G have not been finalized, an outline for 5G is being solidified, and there are several trends that have become apparent. Of note, 5G is likely to use much higher frequency wavelengths the LTE for wireless communication, potentially between 30 and 300 gigahertz, which is a significant departure from the current wavelengths in LTE or prior legacy Radio Access Technologies. In addition, 5G is likely to use a significantly shorter subframe structure. For example, in LTE, a radio subframe is 1 millisecond long. Although the 5G subframe length has not yet been fixed, the 5G subframe length is expected to be considerably shorter than the 1 millisecond subframe length in LTE. The comparatively short subframe results in greater channel stability over the duration of the subframe, since a given subframe permits less time for a channel to change or decay. According to one aspect of the Disclosure, the shorter subframe and higher frequency wavelengths permit a departure from the known MIMO channel equalization procedure. In essence, this permits a novel channel estimation scheme that is designed to result in significantly lower complexity of ZF or MMSE MIMO receivers. According to an aspect of this Disclosure, the resulting ZF and/or MMSE MIMO detection algorithm requires an order of magnitude less computation, which is expected to result in significant savings in chip area and power.

According to another aspect of the disclosure, this proposed algorithm is not limited to 5G, but can rather be generalized to any so called "linear in parameters" system comprising a tracking property. This includes any nonlinear model described as a linear system. Otherwise stated, this algorithm can be applied wherever a linear system comprises a tracking signal that is transmitted over time.

Reducing Frequency of Pseudo-Inverse Calculations by Performing Channel Detection Before Phase Rotation.

According to one aspect of the Disclosure, the resulting method or apparatus results in a computationally efficient method for detection of MIMO systems with a tracking property. According to this Disclosure, tracking information is assessed to calculate a phase shift. This calculation is performed after the channel for a wireless communication is calculated via ZF or MMSE, and before the MIMO detector.

Conventional techniques find a solution of MIMO system irrespective of the system's tracking property. Accordingly, the channel estimation and detection scheme must perform a computationally demanding calculation for every set of inputs. In particular, portions of the MIMO detection involve calculating a pseudo-inverse of the estimated channel matrix, which is a comparatively complex calculation that requires significant resources.

As a general matter, the pseudo-inverse can be calculated when the DMRS is received. Yet, where the 5G subframe length is much shorter, and in light of the increased channel stability inherent in 5G technology, it can be reasonably assumed that the channel will remain acceptably stable throughout the duration of the subframe. In light of this assumed stability, the need to calculate the pseudo-inverse each OFDM symbol is greatly reduced, and it becomes generally acceptable to calculate the pseudo-inverse only once per subframe. This can be performed in response to a single DMRS transmission per subframe, as demonstrated in FIG. 7.

Although the channel is expected to be reasonably stable throughout the subframe, it may be necessary to repeatedly correct for phase shift throughout the subframe. The comparatively higher frequencies planned for 5G transmission are more susceptible to phase noise than the frequencies currently in use in LTE. The phase shift is not anticipated to remain acceptably static throughout the duration of the subframe, and therefore multiple phase shift corrections during the subframe may be necessary. The phase shift is assessed based on a TRS, which may be transmitted over time along a subcarrier, as shown in FIG. 7, or in any other configuration of sufficient frequency to acceptably correct the phase shift. The TRS is assessed to calculate the phase shift in the manner described above, and the phase shift is then corrected through an appropriate rotation of the signal. The signal may be rotated for each OFDM symbol over time, or as often as necessary. This method permits the MIMO detection to be separated from the phase shift correction, such that the pseudo-inverse, which may be performed only once per subframe, is performed with minimal frequency, while still permitting the frequent performance of the comparatively computationally simple procedure of phase shift correction.

MIMO detection is performed based on information received from the DMRS. The actual calculations have been mathematically described above and are well-known. Although the term DMRS has been used in this context, the term DMRS is used for purposes of convenience and is not intended to suggest any specific standards or operations that specifically define DMRS as a term of art. For the purposes of this Disclosure, the DMRS may include any kind of demodulation reference signal that can be used for MIMO detection, whether in 5G, LTE, or a legacy RAT, or otherwise. In the event that further development in 5G standards change the substance or content of DMRS, this Disclosure is intended to include any DMRS, DMRS-equivalent, or DMRS-similar signal from which the channel may be detected.

This method is intended to work with a MIMO wireless communication system; however, the name, MIMO, is not intended as a limitation for this method's use. In the event that other wireless communication systems resembling MIMO are developed, or in the event that dissimilar systems are developed, on which this Disclosure can be used for channel estimation and detection, this Disclosure should be understood to include any such system or systems.

In the course of a MIMO-type transmission, the DMRS and the TRS may be transmitted by, and/or received on, a plurality of antennas. This may include a plurality or transmit antennas and/or a plurality of receive antennas. These antennas may be synchronous or asynchronous, or in a combination of same. For example, in a downlink scenario, the transmit antennas may be asynchronous, and the receive antennas may be synchronous. In an uplink scenario, the transmit antennas may be synchronous, and the receive antennas may be asynchronous. All antennas may be synchronous, or all antennas may be asynchronous, or any combination of the foregoing. 5G communication generally assumes transmissions from a plurality of base stations which are likely to be asynchronous.

According to an aspect of the Disclosure, where the DMRS or the TRS are transmitted, they may be transmitted from a plurality of transmission antennas. This may be any number of the transmit antennas. Similarly, the DMRS or the TRS may be received by all or less than all of the receive antennas.

According to another aspect of the Disclosure, the DMRS may be transmitted in the OFDM wireless communication. Specifically, the DMRS may be transmitted within one or more OFDM symbols or one or more reference elements. According to one aspect of the Disclosure, the DMRS may be transmitted once per subframe, as is shown in FIG. 7. The DMRS may alternatively be transmitted at a greater or lesser frequency than once per subframe. For example, the DMRS may be transmitted at once per frame, rather than once per subframe, or in any other frequency greater than once per subframe. Similarly, the DMRS may be transmitted more frequently than once per subframe. This may be appropriate in periods of particular channel instability. Where the DMRS is transmitted in excess of once per subframe, the MIMO detection may be configured to calculate the pseudo-inverse and/or detect the channel with each received DMRS transmission, or less frequently, as is desired.

According to one aspect of the Disclosure, the DMRS may be transmitted for each subcarrier, as is depicted in FIG. 7. Thus, the DMRS may be transmitted once per subframe, simultaneously among all of the subcarriers. Alternatively, the DMRS may be transmitted for fewer than all subcarriers in a given subframe. Where the DMRS for each subcarrier is not transmitted, an additional step of estimating the channel based on channel estimation of adjacent or nearby subcarriers must be performed. Such estimation is known and need not be described in further detail.

The DMRS may be a single, frontloaded demodulation reference signal. This is congruent with the emerging 5G standards, and takes advantage of the shorter subframes and increased channel stability apparent with 5G technology. The DMRS may be transmitted or received on a physical uplink control channel, the a physical uplink shared channel, or otherwise.

According to an aspect of the Disclosure, the TRS may be received on each symbol of one or more subcarriers within a subframe. As displayed in FIG. 7, the TRS may be transmitted or received within a single subcarrier in a subframe over time. Where this occurs, a subcarrier may be dedicated to transmission or reception of TRS information. Unlike the DMRS, which may be transmitted or received one or few times during a subframe, the TRS should be transmitted frequently or constantly to permit ongoing, repeated phase shift tracking and adjustment. According to one aspect of the Disclosure, the TRS may be transmitted or received on the fourth through the fourteenth OFDM symbols of a single subcarrier within a subframe. According to another aspect of the Disclosure, the TRS may be transmitted on the third through thirteenths subframe symbols.

Once the DMRS is received, a channel estimator calculates a channel estimate matrix from the received demodulation reference signals. Typically, the quantity of rows of the channel estimation matrix corresponds to the quantity of receive antenna ports for the wireless communication, and the quantity of columns of the channel estimation matrix corresponds to the quantity of transmit antenna ports for the wireless communication. Where it is desired to reverse or otherwise alter the construction of the channel estimation matrix, this can be achieved with corresponding modifications to the mathematical formulas provided above.

Upon completion of a channel estimation, a channel equalization may be performed to estimate the symbols transmitted. This may be achieved with a zero-forcing equalizer algorithm or a minimum mean square error equalizer, or other suitable means. The MIMO detection may further comprise isolating each of the plurality of encoded signal data units from the combined signal data unit based on the channel estimates for the plurality of encoded signal data units. Isolating each of the plurality of encoded signal data units from the combined signal data unit based on the channel estimates for the plurality of encoded signal data units may include generating an equalization filter based on the channel estimates for the plurality of channels, and applying the equalization filter to the combined signal data unit to isolate each of the plurality of encoded signal data units from the combined signal data unit.

According to another aspect of the Disclosure, the method of claim 1, further comprises a shared time-frequency channel, said shared time-frequency channel comprising a plurality of channels between a plurality of transmit points and a plurality of receive points, and wherein isolating each of the plurality of encoded signal data units from the combined signal data unit includes determining a channel estimate for each of the plurality of channels, and isolating each of the plurality of encoded signal data units from the combined signal data units based on the channel estimates for the plurality of channels.

According to another aspect of the disclosure, the TRS is transmitted and/or received as part of the wireless communication. This TRS may be called a Phase Noise Compensation Reference Signal. The TRS may be called other names, as created or adopted by the 5G standards, the standards for future implementations of wireless communication or future RAT implementations, industry standards, industry usage, common usage, or otherwise. The TRS comprises information to evaluate the phase shift of the wireless communication. The phase shift may be created primarily by phase noise. Although phase noise is not of paramount concern in LTE and other legacy RATs, the millimeter waves and/or higher transmission frequencies of 5G are significantly more susceptible to phase noise, and therefore additional corrective measures for phase noise must be taken.

The phase noise correction using TRS described herein is appropriate for use in a 5G wireless communication system. It is, however, not limited to 5G, and it may be used in a linear system in which tracking information is available. This may include other wireless communication formats that develop concurrently with, or in succession to 5G. This may include future RATs that are developed subsequently to, or in alternative to, 5G.

As described above, the receive antennas receive a TRS, which comprises data to assess the phase noise and/or phase shift of the signal. The receive antennas transfer this data to a circuit that is configured to arrange this data into a TRS matrix.

With the TRS matrix available, a circuit rotates the detected channel by calculating the Hadamard product of the channel estimation matrix and the TRS matrix. This process corrects for the phase shift of the detected channel. The independent stream of tracking information in the TRS permits the independent calculation of channel and phase shift. This independent calculation permits the calculation of channel, which is a significantly more computationally complex procedure, to be performed fewer times per subframe than the phase rotation. According to one aspect of the Disclosure, the channel is calculated once per subframe, and the tracking information is assessed to rotate and correct the phase shift multiple times per subframe. The phase rotation and correction can be performed for each OFDM symbol in the subframe.

It is anticipated the frame and subframe structure of 5G will be significantly shorter than the frame and subframe structure on LTE. This Disclosure is intended to be functional within such a shorter frame structure. It is anticipated that the 5G subframe may be significantly shorter than one millisecond. This significantly shorter period permits a number of advantages, including increased channel stability over the length of the subframe. This increased channel stability over the length of the subframe permits fewer pseudo-inverse calculations for linear detectors per subframe compared to LTE.

It is anticipated that the 5G standards will include channel estimation based on the frame structure as depicted in FIG. 7, where there is a reference or pilot signal, such as the DMRS, and a TRS is transmitted along a time domain. For applications, such as linear detectors, the ability to reduce the computationally demanding channel pseudo-inverse process provides a significant conservation of resources in processing power. Rather than dedicating the computational resources for channel pseudo-inverse for each OFDM symbol, the channel can be detected less often, and the less computationally demanding step of applying tracking reference symbol information can instead be performed.

In the current wireless technology, each subframe comprises fourteen symbols in the x-axis, during each of which the pseudo-inverse is calculated for MIMO detection. The ability to reduce the calculation of the pseudo-inverse from fourteen times per subframe to one time per subframe results in thirteen fewer pseudo-inverse computations per subframe, which is a significant computational savings. This process provides results that are equivalent to the conventional methods but with significantly reduced complexity and need for computational resources.

The phase shift correction through analysis of the TRS and subsequent signal rotation is designed to correct for phase shift of the wireless communication as it occurs between the transmit source and the receive source. As described above, said phase shift may result from phase noise, to which the anticipated wavelengths for 5G are especially susceptible. Said phase shift may also result, in whole or in part, from a Doppler effect, arising out of a relative change in distance between the transmit source and the receive source.

The transmission of wireless data according to this Disclosure, including the DMRS and the TRS, may occur in an uplink or a downlink scenario. In an uplink scenario, a downlink device, such as for example a user device, transmits wireless data to a wireless network. According to one aspect of the disclosure, this may be a base station. In a downlink scenario, data is transmitted from a network or a base station to a downlink device. Without limitation, such downlink devices may include user equipment, cellular phones, smart phones, wearable devices, tablet computers, laptop computers, personal computers, automobiles, appliances, homes, a home management system, a positioning system, a mapping system, or any other device to receive wireless communication in a downlink setting. It is expressly anticipated that the breadth and/or usage of wireless devices to receive wireless communication in a downlink setting will expand with the use of 5G and subsequent RATs. As such, nothing in this Disclosure should be interpreted as a limitation of this Disclosure as only applying to devices already in existence.

The wireless communication, channel estimation, MIMO symbol detection, phase shift calculation, phase shift correction, and decoding described herein may be performed by a variety of means. They may be performed by an apparatus or collection of apparatuses, which are configured to perform the steps and calculations described herein. They may be performed by a circuit or plurality of circuits, which are configured to performed the steps and calculations described herein. They may be performed by software or a machine readable medium. Said software or machine readable medium may be located at the uplink or downlink location. The circuitry or software to perform these tasks may, according to one aspect of the Disclosure, be located in a modem or baseband modem.

The wireless communication, channel estimation, MIMO symbol detection, phase shift calculation, phase shift correction, and decoding described herein may specifically be performed by a device configured to perform wireless communication over a 5G network. They may be performed by a device configured to perform wireless communication over a MIMO network, or a network utilizing MIMO technology. This may include wherein a plurality of transmit points are a plurality of MIMO transmit antennas and a plurality of receive points are a plurality of MIMO receive antennas.

The channel or channels over which the wireless communications are performed may be a shared time-frequency channel, composed of a plurality of channels between a plurality of transmit points and a plurality of receive points, and wherein an equalization circuit is configured to isolate each of the plurality of encoded signal data units from the combined signal data unit by determining a channel estimate for each of the plurality of channels, and isolating each of the plurality of encoded signal data units from the combined signal data unit based on the channel estimates for each of the plurality of channels.

The wireless communications may be performed wherein an equalization circuit is configured to isolate each of the plurality of encoded signal data units from the combined signal data unit based on the channel estimates for the plurality of encoded signal data units by generating an equalization filter based on the channel estimates for the plurality of channels, and applying the equalization filter to the combined signal data unit to isolate each of the plurality of encoded signal data units from the combined signal data unit.

According to another aspect of the Disclosure, the calculations herein can optionally include wherein the equalization circuit is configured to process the combined signal data unit from the shared time-frequency channel to obtain the plurality of encoded signal data units by isolating each of the plurality of encoded signal data units from the combined signal data unit.

According to another aspect of the Disclosure, the description herein can optionally include wherein the shared time-frequency channel comprises a plurality of channels between a plurality of transmit points and a plurality of receive points, and wherein the equalization circuit is configured to isolate each of the plurality of encoded signal data units from the combined signal data unit by determining a channel estimate for each of the plurality of channels, and isolating each of the plurality of encoded signal data units from the combined signal data units based on the channel estimates for the plurality of channels.

Matrix Decompensation, Generally

The above method for linear detecting relies on calculating a pseudo-inverse of the channel estimation matrix. One method of calculating a pseudo-inverse of the matrix is to rely on matrix decomposition methods. Matrix decomposition can be used to simplify the calculations in linear detection, above. Furthermore, matrix decomposition can provide utility in other aspects of a MIMO system with tracking information.

A number of matrix decompositions are popular methods for processing spatially multiplexed MIMO systems. These decompositions typically include QR decomposition, LU decomposition, LDL decomposition, Cholesky decomposition, singular value decomposition ("SVD"), and eigenvalue decomposition ("EVD"). For example, such useful matrix decompositions can be used in MIMO systems in noise-whitening, precoding, detection etc.

The 5G standards currently in development comprise elements that permit a novel channel estimation scheme that may lead to a significantly lower complexity of such matrix decompositions as described in this Disclosure. It will be shown that the proposed matrix decomposition methods require an order of magnitude less computations and, hence, chip area and power for MIMO systems with tracking property.

Matrix Decompensation for MIMO Linear Detection

The method of Linear Detection as described above can be used with matrix decomposition for channel detection. In this case, the channel estimate matrix $H_i$ at the i-th OFDM symbol is given as:

$$H_i = H \cdot \Theta_i = \begin{bmatrix} h_{11} e^{j\theta_1(i)} & \cdots & h_{1N_t} e^{j\theta_{N_t}(i)} \\ \vdots & \ddots & \vdots \\ h_{N_r,1} e^{j\theta_1(i)} & \cdots & h_{N_r N_t} e^{j\theta_{N_t}(i)} \end{bmatrix} \quad (24)$$

where H is rotated by TRS matrix $\Theta_i$ of complex exponentials $e^{j\Theta_i(i)}$ and "∘" denotes the Hadamard product. Note that in other cases, $\Theta_i$ may not be limited to a matrix of complex exponentials. Another important matrix often used in MIMO systems is a Gram matrix $$G_i = H_i^H H_i = (H \circ \Theta_i)^H H \circ \Theta_i = \Theta_i^H \circ H^H H \circ \Theta_i = \Theta_i^H \circ G \circ \Theta_i \quad (25)$$

Conventional MIMO systems perform matrix decompositions of $H_i$ and $G_i$ matrices at each i-th OFDM symbol, while the proposed method in subsequent Section requires substantially less computations.

To use matrix decomposition to determine the channel, we turn to the matrix multiplications:

$$H_i = \Phi_i H \Theta_i \quad (26)$$

where $\Theta_i$ is a square diagonal matrix with main diagonal $$[|\theta_1(i)| e^{j\angle\theta_1(i)}, \ldots, |\theta_{N_t}(i)| e^{j\angle\theta_{N_t}(i)}]^T$$

and $\Phi_i$ is a square diagonal matrix with main diagonal $$[|\varphi_1(i)| e^{j\angle\varphi_1(i)}, \ldots, |\varphi_{N_r}(i)| e^{j\angle\varphi_{N_r}(i)}]^T,$$

whereby, at this point, Eq. (25) can be rewritten as:

$$G_i = H_i^H H_i = (\Phi_i H \Theta_i)^H \Phi_i H \Theta_i = \Theta_i^H H^H P_{\Phi_i} H \Theta_i, \quad (27)$$

where $P_{\Phi_i} = \Phi_i^H \Phi_i \in \mathbb{R}^{N_r \times N_r}$ is a square diagonal matrix. Typically, $\Phi_i$ is a unitary (complex exponentials on diagonal) and, hence, $P_{\Phi_i}$ equal to identity matrix $P_{\Phi_i} = I$. Then, a simplified form of Gram matrix $G_i$ in Eq.(27) can be expressed as $$G_i' = \Theta_i^H H^H H \Theta_i = \Theta_i^H G \Theta_i \quad (28)$$

Reduced-Complexity QR (Orthogonal Matrix and Upper Triangular Matrix) and Lower Upper Decompensation ("LU Decomposition")

QR decomposition decomposes matrix A into a product A=QR, where Q is an orthogonal matrix and R is an upper triangular matrix. QR decomposition is often used to solve the linear least squares problem, and is the basis for a particular eigenvalue algorithm, the QR algorithm.

Assuming that inputs for QR decomposition are defined by Eq.(26) and properties of $\Theta_i$ and $\Phi_i$, a reduced-complexity QR decomposition can be written as $$qr(H_i) = Q_i R_i = \Phi_i qr(H) \Theta_i = \Phi_i Q R \Theta_i \quad (29)$$

where Q is a $N_r \times N_r$ complex-valued unitary matrix and R is a $N_r \times N_t$ upper-triangular matrix with real-valued main diagonal. A more general Eq.(29) can be applied to Eq.(28) as well.

Similarly, a reduced-complexity LU decomposition can be written as $$lu(H_i) = L_i U_i = \Phi_i lu(H) \Theta_i = \Phi_i LU \Theta_i \quad (30)$$

where L is a $N_r \times N_t$ lower triangular matrix and U is a $N_r \times N_t$ upper-triangular matrix. Essentially, any Gaussian elimination type decomposition can be represented in such a way.

Reduced-Complexity Cholesky and LDL Decompositions

A Cholesky decomposition allows for the decomposition of a Hermitian, positive-definite matrix, such that decomposition yields a product of a lower triangular matrix and the conjugate transpose of the lower triangular matrix. An LDL composition is a similar form of decomposition using a lower unit triangular matrix and a diagonal matrix. Unlike QR and LU-like decompositions described above, both Cholesky and LDL decompositions require a matrix to be decomposed to be positive definite. Hence, this can be applied to Hermitian $G_i$, which is, in general, a positive-semidefinite matrix, but this property can be relaxed to suffice Cholesky and LDL decomposition requirements. A general reduced-complexity Cholesky-like decomposition can be derived using QR as $$chol(G_i) = \Theta_i^H qr(H^H) P_{\Phi_i} qr(H) \Theta_i = \Theta_i^H R^H Q^H P_{\Phi_i} Q R \Theta_i \quad (31)$$

Using Eq.(28) and result of Eq.(31), a reduced-complexity Cholesky and LDL decompositions for simplified $G_i'$ can be calculated directly as $$chol(G_i') = \tilde{R}_i^H \tilde{R}_i = \Theta_i^H chol(G') \Theta_i = \Theta_i^H \tilde{R}^H \tilde{R} \Theta_i \quad (32)$$

$$ldl(G_i') = \tilde{L}_i \tilde{D}_i \tilde{L}_i^H = \Theta_i^H ldl(G') \Theta_i = \Theta_i^H \tilde{L} \tilde{D} \tilde{L}^H \Theta_i \quad (33)$$

where $\tilde{R}$ is a $N_r \times N_t$ upper-triangular matrix with real-valued main diagonal, $\tilde{L}$ is a $N_r \times N_t$ lower triangular matrix with all 1's on main diagonal and $\tilde{D}$ is a $N_r \times N_t$ real-valued diagonal matrix.

Reduced-Complexity EVD and SVD

SVD is a general decomposition that can be applied to rectangular matrices. Therefore, a reduced-complexity SVD applied to matrix in Eq. (26) can be written as $$svd(H_i) = U_i \Sigma_i S_i^H = \Phi_i svd(H) \Theta_i = \Phi_i U \Sigma S^H \Theta_i \quad (34)$$

where U is a $N_r \times N_r$ complex-valued unitary matrix of left-singular vectors, $\Sigma$ is a $N_r \times N_t$ diagonal matrix of real non-negative singular values, and S is a $N_t \times N_t$ complex-valued unitary matrix of right-singular vectors.

EVD requires a being decomposed matrix to be positive definite. Hence, we can apply it to Hermitian $G_i$ and a reduced-complexity EVD-like decomposition can be derived using SVD as $$evd(G_i) = \Theta_i^H svd(H^H) P_{\Phi_{isvd}} H) \\ \Theta_i = \Theta_i^H S \Sigma^H U^H P_{\Phi_i} U \Sigma S^H \Theta_i \quad (35)$$

Using Eq.(28) and result of Eq.(35), EVD for simplified matrix $G_i'$ can be directly calculated as $$evd(G_i') = V_i \Lambda_i V_i^{-1} = \Theta_i^H evd(G') \Theta_i = \\ \Theta_i^H V \Lambda V^{-1} \Theta_i = \Theta_i^H V \Lambda V^H \Theta_i, \quad (36)$$

where V is a $N_t \times N_t$ matrix of eigenvectors and $\Lambda$ is a $N_t \times N_t$ diagonal matrix of real non-negative eigenvalues. Matrix V here is unitary and, hence, $V^{-1} = V^H$.

Further Examples of Applications for MIMO Systems with Tracking

Matrix decompensation using tracking information is not limited to application in linear detection, but can also be used in other applications related to MIMO. The following examples are additional MIMO applications for which matrix decompensation can be used.

Noise Whitening Filter

Typical noise whitening filter applies a square root matrix of positive definite $G_i$ or simplified $G_i'$ using either QR decomposition (Eq.(29)) or Cholesky decomposition (Eq. (32)) as $$G_i^{1/2} = qr(H_i) = Q_i R_i = \Phi_i qr(H) \Theta_i = \Phi_i Q R \Theta_i \quad (37)$$

$$(G_i'^{1/2})^H (G_i'^{1/2}) = chol(G_i') = \tilde{R}_i^H \tilde{R}_i = \Theta_i^H chol(G') \Theta_i = (\tilde{R} \Theta_i)^H (\tilde{R} \Theta_i). \quad (38)$$

Maximum Likelihood and Tree Search Detectors

These types of detectors typically transform original minimization metric $\|x_i - H_i c_i\|^2$ into a modified metric $\|Q_i^H x_i - R_i c_i\|^2$ using QR decomposition. Then, a reduced-complexity metric can be written as $$\|Q_i^H x_i - R_i c_i\|^2 = \|Q^H \Phi_i^H x_i - R \Theta_i c_i\|^2. \quad (39)$$

Pseudo-Inverse and Linear Detectors

Linear detectors like MMSE/ZF detectors are calculating pseudo-inverse matrix $F_i$. It can be shown that for systems with tracking such pseudo-inverse matrix $F_i$ can be calculated with reduced complexity as $$F_i = \Theta_i^H F \Phi_i^H \quad (40)$$

where $F = (H^H H + N_0 I)^{-1} H^H$ for MMSE detector. In practice, pseudo-inverse matrix F is calculated using one of the matrix decompositions described above. For example, using LDL decomposition $$F = (H^H H + N_0 I)^{-1} H^H = (LDL^H)^{-1} H^H = L^{-H} D^{-1} L^{-1} H^H \quad (41)$$

Assuming $H_i^H = \Theta_i^H H^H \Phi_i^H$ and $P_{\Phi_i} = I$, result of Eqs.(40)-(41) can be obtained explicitly using Eq.(32) as $$F_i = L_i^{-H} D_i^{-1} L_i^{-1} H_i^H = (\Theta_i^H H^H \Phi_i^H \Phi_i H \Theta_i + N_0 I)^{-1} \Theta_i^H H^H \Phi_i^H = \\ \Theta_i^H (H^H H + N_0 I)^{-1} H^H \Phi_i^H = \Theta_i^H (L^{-H} D^{-1} L^{-1} H^H) \Phi_i^H. \quad (42)$$

All acronyms defined in the above description additionally hold in all claims included herein.

While the Disclosure has been particularly shown and described with reference to specific embodiments, it should be understood by those skilled in the art that various changes in form and detail may be made therein without departing from the spirit and scope of the Disclosure as defined by the appended claims. The scope of the Disclosure is thus indicated by the appended claims and all changes which come within the meaning and range of equivalency of the claims are therefore intended to be embraced.

In example 1, a method adapted for performing MIMO detection in a mobile communication device is disclosed, the method comprising:

performing wireless communication via a transceiver of the mobile communication device;

generating a demodulation reference signal based on a first plurality of symbols of the wireless communication;

generating a channel estimation matrix based on the demodulation reference signal;

inverting the channel estimation matrix to obtain a channel pseudo-inverse matrix;

generating a tracking reference signal based on a second plurality of symbols of the wireless communication;

calculating a phase shift for one or more additional symbols based on the tracking reference signal;

determining a corrected channel pseudo-inverse matrix for the one or more additional symbols by adjusting the channel pseudo-inverse matrix according to the calculated phase shift; and controlling the transceiver to perform data detection on one or more orthogonal frequency division multiplexing subcarriers based on the corrected channel pseudo-inverse matrix.

In example 2, the method of example 1 is disclosed, wherein the wireless communication is received on a multiple-input and multiple-output network.

In example 3, the method of example 1 or 2 is disclosed, wherein the wireless communication is a multiple-input and multiple-output wireless communication.

In example 4, the method of any one of examples 1 to 3 is disclosed, further comprising receiving the wireless communication on a plurality of receive antennas.

In example 5, the method of any one of examples 1 to 4 is disclosed, further comprising receiving the wireless communication from a plurality of transmission antennas.

In example 6, the method of example 4 is disclosed, wherein the plurality of receive antennas are synchronous.

In example 7, the method of example 4 is disclosed, wherein the plurality of receive antennas are asynchronous.

In example 8, the method of example 5 is disclosed, wherein the plurality of transmission antennas are synchronous.

In example 9, the method of example 5 is disclosed, wherein the plurality of transmission antennas are asynchronous.

In example 10, the method of any one of examples 4 to 9 is disclosed, wherein the plurality of transmission antennas and/or receive antennas are a plurality of Multiple Input Multiple Output ("MIMO") transmit antennas and a plurality MIMO receive antennas.

In example 11, the method of any one of examples 1 to 10 is disclosed, further comprising transmitting the wireless communication from a plurality of asynchronous transmitters and receiving the wireless communication on a plurality of synchronous receivers.

In example 12, the method of any one of examples 1 to 10 is disclosed, further comprising receiving the wireless communication from a plurality of synchronous transmitters and receiving the wireless communication on a plurality of asynchronous receivers.

In example 13, the method of any one of examples 1 to 10 is disclosed, further comprising receiving the wireless communication from a plurality of asynchronous transmitters and receiving the wireless communication with a plurality of asynchronous receivers.

In example 14, the method of any one of examples 1 to 13 is disclosed, wherein the demodulation reference signal is received on one or more orthogonal frequency division multiplexing symbols.

In example 15, the method of example 14 is disclosed, further comprising receiving the demodulation reference signal on one or more orthogonal frequency division multiplexing symbols per subcarrier per subframe.

In example 16, the method of example 14 or 15 is disclosed, further comprising receiving the demodulation reference signal on only one orthogonal frequency division multiplexing symbol per subcarrier per subframe.

In example 17, the method of any one of examples 14 to 16 is disclosed, wherein the demodulation reference signal is a single, frontloaded demodulation reference signal.

In example 18, the method of any one of examples 14 to 17 is disclosed, wherein the demodulation reference signal is received on a plurality of subcarriers.

In example 19, the method of any one of examples 14 to 18 is disclosed, wherein the demodulation reference signal is received on a physical uplink control channel.

In example 20, the method of any one of examples 14 to 18 is disclosed, wherein the demodulation reference signal is received on a physical uplink shared channel.

In example 21, the method any one of examples 1 to 20 is disclosed, wherein the wireless communication further comprises a tracking reference signal.

In example 22, the method of any one of examples 1 to 21 is disclosed, further comprising receiving the tracking reference signal on a physical uplink control channel.

In example 23, the method of any one of examples 1 to 22 is disclosed, further comprising receiving the tracking reference signal on a physical uplink shared channel.

In example 24, the method of any one of examples 1 to 23 is disclosed, wherein the tracking reference signal is received on each symbol of a single subcarrier within a subframe.

In example 25, the method of any one of examples 1 to 24 is disclosed, wherein the tracking reference signal is received on fewer than each symbol of a single subcarrier within a subframe.

In example 26, the method of any one of examples 1 to 23 or 25 is disclosed, wherein the tracking reference signal is received on symbols four through fourteen of a single subcarrier within a subframe.

In example 27, the method of any one of examples 1 to 23 or 25 is disclosed, wherein the tracking reference signal is received on symbols three through thirteen of a single subcarrier within a subframe.

In example 28, the method of any one of examples 1 to 27 is disclosed, further comprising creating the channel estimation matrix from the demodulation reference signal using a channel estimator.

In example 29, the method of any one of examples 1 to 28 is disclosed, wherein the channel estimation matrix comprises a quantity of rows, said quantity corresponding to a quantity of receive antennas for the wireless communication.

In example 30, the method of any one of examples 1 to 29 is disclosed, wherein the channel estimation matrix comprises a quantity of columns, said quantity corresponding to a quantity of transmit antennas for the wireless communication.

In example 31, the method of any one of examples 1 to 30 is disclosed, wherein a first dimension of the channel estimate matrix corresponds to a quantity of receive antennas, and a second dimension of the channel estimate matrix corresponds to a quantity of transmit antennas.

In example 32, the method of any one of examples 1 to 31 is disclosed, wherein the wireless communication is divided into a plurality of subframes, and wherein the channel estimate matrix is calculated once per subframe.

In example 33, the method of example 32 is disclosed, wherein the channel estimate matrix is calculated in response to a receipt of the demodulation reference signal.

In example 34, the method of any one of examples 1 to 33 is disclosed, wherein obtaining the channel pseudo-inverse matrix further comprises isolating each of a plurality of encoded signal data symbols from the wireless communication based on the channel estimation matrix.

In example 35, the method of example 34 is disclosed, wherein isolating each of the plurality of encoded signal data symbols from the wireless communication based on the channel estimation matrix includes generating an equalization filter based on the channel estimation matrix and applying the equalization filter to the wireless communication.

In example 36, the method of example 34 or 35 is disclosed, further comprising a shared time-frequency channel, said shared time-frequency channel comprising a plurality of channels between a plurality of transmit antennas and a plurality of receive antenna, and further comprising determining a channel estimation matrix for each of the plurality of channels, and isolating each of a plurality of encoded signal data units from combined signal data based on the channel estimates for the plurality of channels.

In example 37, the method of any one of examples 1 to 36 is disclosed, further comprising using the created channel estimation matrix to perform a MIMO detection to estimate the symbols transmitted.

In example 38, the method of any one of example 37 is disclosed, further comprising performing the MIMO detection with a zero-forcing equalizer algorithm.

In example 39, the method of example 37 is disclosed, further comprising performing the MIMO detection with a minimum mean square error equalizer.

In example 40, the method of any one of examples 1 to 39 is disclosed, wherein the tracking reference signal is a Phase Noise Compensation Reference Signal.

In example 41, the method of example 40 is disclosed, wherein the Phase Noise Compensation Reference Signal is included for use in 5G.

In example 42, the method of any one of examples 1 to 41 is disclosed, wherein the phase shift results from phase noise.

In example 43, the method of any one of examples 1 to 41 is disclosed, wherein the phase shift results from Doppler effect.

In example 44, the method of any one of examples 40 to 43 is disclosed, further comprising the wireless communication being carried on a wavelength with increased susceptibility to phase noise compared to a Radio Access Technology operating on a longer wavelength.

In example 45, the method of any one of examples 1 to 44 is disclosed, further comprising creating a tracking reference signal matrix.

In example 46, the method of example 45 is disclosed, further comprising adjusting the channel pseudo-inverse matrix by calculating a Hadamard product of the pseudo-inverse matrix and the tracking reference signal matrix.

In example 47, the method of example 46 is disclosed, wherein the corrected channel pseudo-inverse matrix is a detected channel that has been corrected for phase noise.

In example 48, the method of any one of examples 1 to 47 is disclosed, further comprising receiving the wireless communication on a 5G network.

In example 49, the method of any one of examples 1 to 48 is disclosed, further comprising receiving the wireless communication on one or more transmission subframes is disclosed, wherein each of the one or more transmission subframes is shorter than one millisecond.

In example 50, the method of any one of examples 1 to 49 is disclosed, wherein the wireless communication comprises a channel, and wherein the channel remains acceptably stable throughout the subframe.

In example 51, the method of example 50 is disclosed, wherein the channel stability permits calculation of fewer channel pseudo-inverse matrices per subframe compared to legacy radio access technology.

In example 52, the method of any one of examples 1 to 51 is disclosed, wherein the wireless communication occurs in a downlink scenario.

In example 53, the method of any one of examples 1 to 51 is disclosed, wherein the wireless communication occurs in an uplink scenario.

In example 54, the method of any one of examples 1 to 53 is disclosed, further comprising receiving a demodulation reference signal on a first subcarrier during an orthogonal frequency-division multiplexing symbol period.

In example 55, the method of any one of examples 1 to 54 is disclosed, further comprising generating a channel detection matrix based on the demodulation reference signal.

In example 56, the method of any one of examples 1 to 55 is disclosed, further comprising receiving the tracking reference signal on a plurality of subcarriers.

In example 57, the method of any one of examples 1 to 56 is disclosed, further comprising rotating a channel pseudo-inverse matrix according to the phase shift to obtain a corrected channel pseudo-inverse matrix for a second symbol period.

In example 58, the method of examples 57 is disclosed, further comprising rotating a first corrected channel pseudo-inverse matrix according to the phase shift to obtain a second corrected pseudo-inverse matrix for a second symbol period.

In example 59, the method of any one of examples 1 to 58 is disclosed, further comprising performing a MIMO detection on a data symbol received after calculating the channel pseudo-inverse matrix, the MIMO detection being performed in accordance with the channel pseudo-inverse matrix and adjusted in accordance with the phase shift.

In example 60, the method of any one of examples 1 through 59 is disclosed, wherein the first plurality of symbols is a plurality of demodulated reference symbols.

In example 61, the method of any one of examples 1 through 60 is disclosed, wherein the second plurality of symbols is a plurality of tracking reference symbols.

In example 62, the method of any one of examples 1 through 61 is disclosed, further comprising receiving demodulation reference symbols on a plurality of subcarriers.

In example 63, the method of example 62 is disclosed, further comprising generating a channel detection matrix based on the demodulation reference signal for each of the demodulation reference symbols received on the plurality of subcarriers.

In example 64, the method of any of examples 1-61 is disclosed, further comprising using a method of matrix decomposition to invert the channel estimation matrix to obtain a channel pseudo-inverse matrix.

In example 65, the method of any of example 64 is disclosed, further comprising the method of matrix decomposition being QR Decomposition.

In example 66, the method of example 64 is disclosed, further comprising the method of matrix decomposition being Lower-Upper Decomposition.

In example 67, the method of example 64 is disclosed, further comprising the method of matrix decomposition being a Cholesky decomposition.

In example 68, the method of example 64 is disclosed, further comprising the method of matrix decomposition being LDL Decompensation.

In example 69, the method of example 64 is disclosed, further comprising the method of matrix decomposition being Eigenvalue Decompensation.

In example 70, the method of example 64 is disclosed, further comprising the method of matrix decomposition being Singular Value Decompensation.

In example 71, an apparatus is disclosed, including circuitry, configured to perform the method of any one of examples 1 through 70.

In example 72, a user device is disclosed, configured to perform the method of any one of examples 1 through 70.

In example 73, a device is disclosed, including, but not limited to, a computer, a desktop computer, a smartphone, a wearable device, a motor vehicle, an appliance, a home management system, a positioning system, a mapping system, or any other device with a wireless network connection, configured to perform the method of any one of examples 1 through 70.

In example 74, a device is disclosed configured to connect to a wireless network through 5th Generation Wireless, configured to perform the method of any one of examples 1 through 70.

In example 75, a MIMO device is disclosed, including, but not limited to a base station, configured to perform the method of any one of examples 1 through 70.

In example 76, an apparatus for wireless communication is disclosed, said apparatus comprising:
a transceiver, configured to perform a wireless communication comprising a demodulation reference signal and a tracking reference signal;
a signal processing circuit configured to generate a channel estimation matrix for the wireless communication; and
a phase calculation circuit configured to determine a phase shift of the wireless communication based on a tracking reference signal;
wherein the signal processing circuit is further configured to generate a channel estimation matrix based on the received demodulation reference signal and to invert the channel estimation matrix to obtain a channel pseudo-inverse matrix;
wherein the phase calculation circuit is further configured to generate a phase shift for one or more additional symbols based on the tracking reference signal and to determine a corrected channel pseudo-inverse matrix by adjusting the channel pseudo-inverse matrix according to the calculated phase shift; and wherein the signal processing circuit is further configured to perform data detection on one or more orthogonal frequency division multiplexing subcarriers based on the corrected channel pseudo-inverse matrix.

In example 77, a processing circuit arrangement for a wireless communication is disclosed, said processing circuit arrangement comprising an antenna, configured to receive a wireless communication comprising a demodulation reference signal and a tracking reference signal;
a signal processing circuit configured to create a channel estimation matrix for the wireless communication; and
a phase calculation circuit configured to calculate a phase shift of the wireless communication using a tracking reference signal;
wherein the signal processing circuit creates a channel estimation matrix based on the received demodulation reference signal and inverts the channel estimation matrix to obtain a channel pseudo-inverse matrix;
wherein the phase calculation circuit calculates a phase shift for one or more additional symbols based on the tracking reference signal and determines a corrected channel pseudo-inverse matrix by adjusting the channel pseudo-inverse matrix according to the calculated phase shift; and wherein the signal processing circuit performs data detection on one or more orthogonal frequency division multiplexing subcarriers using the corrected channel pseudo-inverse matrix.

In example 78, the subject matter of examples 76 or 77 is disclosed, further comprising the phase calculation circuit rotating the channel pseudo-inverse matrix based on a plurality of calculated phase shifts to obtain a plurality of corrected channel estimation matrices.

In example 79, the subject matter of any one of examples 76 to 78 is disclosed, further comprising a plurality of multiple input multiple output receive antennas, which receive wireless communication from a plurality of multiple input multiple output transmit antennas.

In example 80, the apparatus of examples 76 through 79 is disclosed, configured as a user equipment.

In example 81, the apparatus of any one of examples 76 through 79 is disclosed, configured as a user device, including, but not limited to, a computer, a desktop computer, a smartphone, a wearable device, or any other user device with a wireless network connection.

In example 82, the apparatus of any one of examples 76 through 79 is disclosed, configured as a motor vehicle, an appliance, a home management system, a positioning system, a mapping system, or any other device with a wireless network connection.

In example 83, the apparatus of any one of examples 76 through 82 is disclosed, configured to connect to a wireless network through 5G.

In example 84, the subject matter of any one of examples 76 through 83 is disclosed, further comprising the signal processing circuit being configured to process the wireless communication to obtain a first plurality of symbols comprising the demodulation reference signal and to calculate a channel for the wireless communication using the demodulation reference signals.

In example 85, the subject matter of example 84 is disclosed, wherein a shared time-frequency channel is composed of a plurality of channels between a plurality of transmit antennas and a plurality of receive antennas, and wherein the signal processing circuit is configured to determine a channel estimate for each of the plurality of channels.

In example 86, the subject matter of example 85 is disclosed, such that said subject matter can optionally include wherein the plurality of transmit antennas are a plurality of Multiple Input Multiple Output transmit antennas and the plurality of receive antennas are a plurality of Multiple Input Multiple Output receive antennas.

In example 87, a means for decoding a wireless communication is disclosed, wherein said means performs any one of method 1 through 70.

In example 88, Machine-readable storage including machine-readable instructions is disclosed, when executed, to implement a method or realize an apparatus as disclosed in any preceding example.

In example 89, a method of performing matrix decomposition in a multiple-input multiple-output system with tracking is disclosed, said method comprising:
receiving a wireless communication via a receiver of a mobile communication device; deriving a demodulation reference signal from a first plurality of symbols of the wireless communication;
creating a channel estimation matrix using the demodulation reference signal;
calculating a decompensation matrix of the channel estimation matrix;
deriving a tracking reference signal from a second plurality of symbols of the wireless communication;
calculating a phase shift for one or more additional symbols based on the tracking reference signal; and determining a corrected decompensation matrix for the one or more additional symbols by adjusting the decompensation matrix according to the calculated phase shift.

In example 90, the method of example 89 is disclosed, further comprising calculating the decompensation matrix using QR Decomposition.

In example 91, the method of example 89 is disclosed, further comprising calculating the decompensation matrix using Lower-Upper Decomposition.

In example 92, the method of example 89 is disclosed, further comprising calculating the decompensation matrix using Cholesky decomposition.

In example 93, the method of example 89 is disclosed, further comprising calculating the decompensation matrix using LDL Decompensation.

In example 94, the method of example 89 is disclosed, further comprising calculating the decompensation matrix using Eigenvalue Decompensation.

In example 95, the method of example 89 is disclosed, further comprising calculating the decompensation matrix using Singular Value Decompensation.

In example 96, the example XYZ is disclosed, the method of any one of examples 89 through 95 is disclosed, further comprising the decompensation matrix being a noise whitening filter.

In example 97, the method of any one of examples 89 through 95 is disclosed, further comprising the decompensation matrix being a maximum likelihood detector.

In example 98, the method of any one of examples 89 through 95 is disclosed, further comprising the decompensation matrix being a tree search detector.

In example 99, the method of any one of examples 89 through 95 is disclosed, further comprising the decompensation matrix being a pseudo-inverse matrix.

In example 100, the method of any one of examples 89 through 95 is disclosed, further comprising the decompensation matrix being a linear detector.

In example 101, the method of example 89 is disclosed, further comprising calculating the decompensation matrix using one of QR Decomposition, Lower-Upper Decomposition, Cholesky decomposition, LDL Decompensation, Eigenvalue Decompensation, or Singular Value Decompensation.

What is claimed is:

1. A method for performing MIMO detection in a mobile communication device, the method comprising:
   receiving on a plurality of asynchronous receive antennas a wireless communication comprising a demodulation reference signal and a tracking reference signal;
   calculating from the received wireless communication receive-specific phase shifts;
generating a channel estimation matrix based on the demodulation reference signal and the receive-specific phase shifts;
   inverting the channel estimation matrix to obtain a channel pseudo-inverse matrix;
   calculating from the received tracking reference signal first transmit-specific phase shifts of the asynchronous transmit antennas;
   correcting the channel pseudo-inverse matrix for each of the plurality of receive antennas for a symbol within a subframe according to the calculated first transmit-specific phase shifts and the receive-specific phase shifts;
   calculating from the received tracking reference signal second transmit-specific phase shifts for the plurality of asynchronous receive antennas; and
   correcting the channel pseudo-inverse matrix for each of the plurality of asynchronous receive antennas for a subsequent symbol within the subframe according to the second transmit-specific phase shifts and the receive-specific phase shifts.

2. The method of claim 1, wherein the wireless communication is received on a multiple-input and multiple-output network.

3. The method of claim 1, wherein a first dimension of the channel estimate matrix corresponds to a quantity of receive antennas, and a second dimension of the channel estimate matrix corresponds to a quantity of transmit antennas.

4. The method of claim 1, wherein obtaining the channel pseudo-inverse matrix further comprises isolating each of a plurality of encoded signal data symbols from the wireless communication based on the channel estimation matrix.

5. The method of claim 1, further comprising using the generated channel estimation matrix to perform a MIMO detection to estimate the symbols transmitted.

6. The method of claim 1, wherein the tracking reference signal is a Phase Noise Compensation Reference Signal.

7. The method of claim 1, further comprising adjusting the channel pseudo-inverse matrix by calculating a Hadamard product of the channel pseudo-inverse matrix and the generated tracking reference signal.

8. The method of claim 1, further comprising using a method of matrix decomposition to invert the channel estimation matrix to obtain a channel pseudo-inverse matrix.

9. The method for performing MIMO detection in a mobile communication device of claim 1, further comprising receiving the wireless communication from a plurality of asynchronous transmit antennas; and wherein the transmit-specific phase shifts are transmit-specific phase shifts corresponding to the plurality of asynchronous transmit antennas.

10. The method of claim 5, further comprising performing the MIMO detection with a zero-forcing equalizer algorithm.

11. The method of claim 5, further comprising performing the MIMO detection with a minimum mean square error equalizer.

12. The method of claim 8, further comprising the method of matrix decomposition being QR Decomposition.

13. The method of claim 8, further comprising the method of matrix decomposition being Lower-Upper Decomposition.

14. The method of claim 8, further comprising the method of matrix decomposition being a Cholesky decomposition.

15. The method of claim 8, further comprising the method of matrix decomposition being LDL Decompensation.

16. The method of claim 8, further comprising the method of matrix decomposition being Eigenvalue Decompensation.

17. The method of claim 8, further comprising the method of matrix decomposition being Singular Value Decompensation.

18. A processing circuit arrangement for a wireless communication, said processing circuit arrangement comprising a transceiver, configured to receive on a plurality of asynchronous receive antennas and from a plurality of asynchronous transmit antennas a wireless communication comprising a demodulation reference signal and a tracking reference signal;
   a signal processing circuit configured to calculate from the received wireless communication receive-specific phase shifts of the asynchronous receive antennas;

generate a channel estimation matrix based on the demodulation reference signal and the receive-specific phase shifts; and invert the channel estimation matrix to obtain a channel pseudo-inverse matrix;

a phase calculation circuit configured to calculate from the received tracking reference signal first transmit-specific phase shifts of the asynchronous transmit antennas;

correct the channel pseudo-inverse matrix for each of the plurality of asynchronous receive antennas using the first transmit-specific phase shifts and the receive-specific phase shifts; and calculate from the received tracking reference signal second transmit-specific phase shifts for the plurality of asynchronous receive antennas; and correct the channel pseudo-inverse matrix for each of the plurality of receive antennas for a subsequent symbol within the subframe according to the second transmit-specific phase shifts and the receive-specific phase shifts.

19. The processing circuit arrangement of claim 18, further comprising the phase calculation circuit rotating the channel pseudo-inverse matrix based on a plurality of calculated phase shifts to obtain a plurality of corrected channel estimation matrices.

* * * * *